US011622384B2

(12) United States Patent
Guo et al.

(10) Patent No.: US 11,622,384 B2
(45) Date of Patent: Apr. 4, 2023

(54) HYBRID CARRIER SENSE MULTIPLE ACCESS SYSTEM WITH COLLISION AVOIDANCE FOR IEEE 802.15.4 TO ACHIEVE BETTER COEXISTENCE WITH IEEE 802.11

(71) Applicants: Mitsubishi Electric Research Laboratories, Inc., Cambridge, MA (US); Mitsubishi Electric Corporation, Tokyo (JP)

(72) Inventors: Jianlin Guo, Newton, MA (US); Philip Orlik, Cambridge, MA (US); Yukimasa Nagai, Tokyo (JP); Takenori Sumi, Tokyo (JP)

(73) Assignees: Mitsubishi Electric Research Laboratories, Inc., Cambridge, MA (US); Mitsubishi Electric Corporation, Tokyo (JP)

( * ) Notice: Subject to any disclaimer, the term of this patent is extended or adjusted under 35 U.S.C. 154(b) by 177 days.

(21) Appl. No.: 17/072,062

(22) Filed: Oct. 16, 2020

(65) Prior Publication Data
US 2021/0144767 A1 May 13, 2021

Related U.S. Application Data

(63) Continuation-in-part of application No. 16/676,676, filed on Nov. 7, 2019, now Pat. No. 11,166,315.

(51) Int. Cl.
*H04W 74/08* (2009.01)
*H04B 17/336* (2015.01)
(Continued)

(52) U.S. Cl.
CPC ...... *H04W 74/0816* (2013.01); *H04B 17/336* (2015.01); *H04W 24/10* (2013.01); *H04W 74/008* (2013.01)

(58) Field of Classification Search
CPC .............. H04L 5/0062; H04W 16/14; H04W 74/0808; H04W 74/0816
See application file for complete search history.

(56) References Cited

U.S. PATENT DOCUMENTS

| 2009/0012738 A1* | 1/2009 | Hart ............... H04W 16/20 702/127 |
| 2012/0088536 A1* | 4/2012 | Hwang ........... H04W 74/0816 455/515 |

(Continued)

*Primary Examiner* — Raj Jain
(74) *Attorney, Agent, or Firm* — Gennadiy Vinokur; Hironori Tsukamoto

(57) ABSTRACT

A wireless smart utility network (Wi-SUN) device participating in a Wi-SUN network for coexistence with a Wi-Fi HaLow network sharing frequency spectra between the networks is provided. The Wi-SUN device includes a receiver to receive packets of neighbor Wi-SUN devices, a memory configured to store computer executable programs including a hybrid carrier-sense multiple access with collision avoidance (CSMA/CA) control program and Wi-SUN backoff control program, a processor configured to execute the hybrid CSMA/CA control program including instructions that steps of estimating a severity of Wi-Fi Halow interference based on one or combination of the severity metrics, selecting a CSMA/CA mode between predetermined CSMA/CA modes in response to the estimated severity, detecting a channel status based on the hybrid carrier-sense multiple access, wherein if the channel status is not idle, a maximum limited number of times for re-attempting a packet transmission is checked to determine an allowability of re-attempting the packet transmission, and a transmitter to transmit packets according to a determination result of the allowability.

20 Claims, 13 Drawing Sheets

(51) Int. Cl.
    *H04W 24/10*     (2009.01)
    *H04W 74/00*     (2009.01)

(56)           References Cited

U.S. PATENT DOCUMENTS

| | | | |
|---|---|---|---|
| 2018/0367286 A1* | 12/2018 | Guo | H04L 5/0062 |
| 2019/0250898 A1* | 8/2019 | Yang | H04L 41/082 |
| 2020/0050753 A1* | 2/2020 | Davis | G06F 21/6218 |
| 2021/0144764 A1 | 5/2021 | Guo et al. | |
| 2021/0144767 A1* | 5/2021 | Guo | H04B 17/336 |

\* cited by examiner

| 802.11ah Traffic (kbps) | 802.15.4g Traffic (kbps) | Receiving Rate (802.11ah) | Receiving Rate (802.15.4g) |
|---|---|---|---|
| 800 | 150 | 99.99% | 4.32% |
| 600 | 150 | 99.99% | 15.38% |
| 600 | 100 | 99.99% | 23.51% |
| 600 | 80 | 99.99% | 28.77% |
| 400 | 50 | 99.99% | 84.27% |
| 400 | 10 | 99.99% | 98.99% |
| 200 | 50 | 99.98% | 99.08% |

FIG. 1

802.11ah and 802.15.4g CSMA/CA Parameter Value Comparison

| Backoff Parameter | 802.11ah Value | 802.15.4g Value |
|---|---|---|
| CCA Time | ≤ 40 us | 128 μs |
| Slot Time (called backoff period in 802.15.4g) | 52 μs | 1140 μs |
| Gap between data and ACK (called SIFS in 802.11ah) | 160 μs | 1000 μs |
| Minimum Idle time for immediate access (called DIFS in 802.11ah) | 264 μs | 1000 μs |
| Turnaround time | ≤ 5 μs | 1000 μs |

FIG. 4

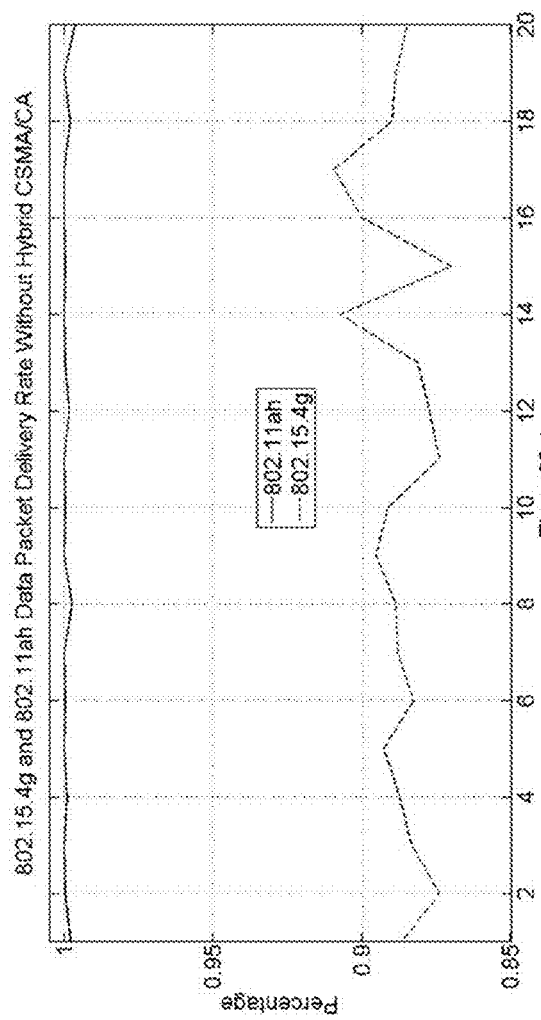
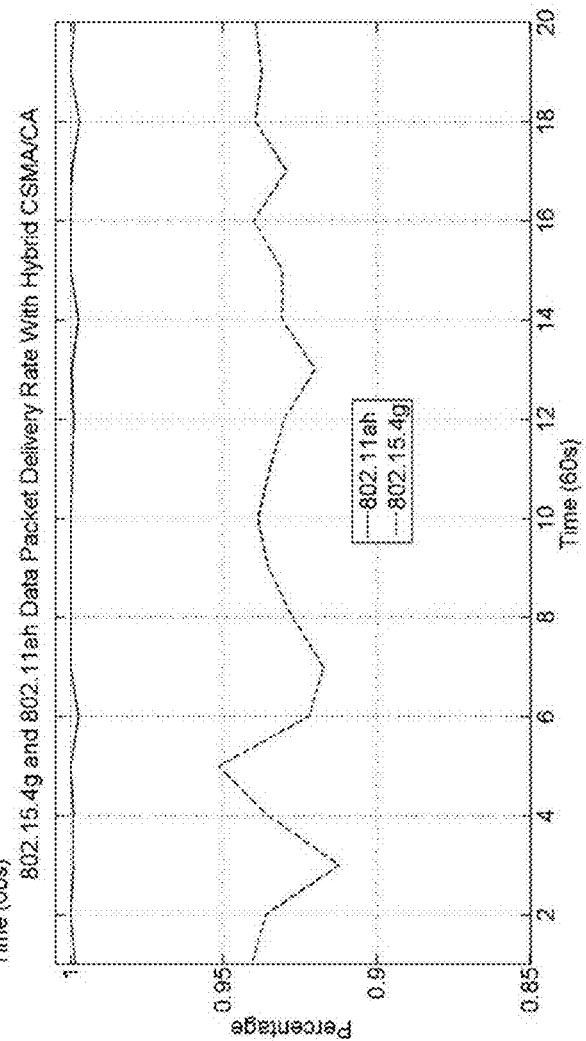
FIG. 7A
FIG. 7B

CSMA-CA algorithm

HYBRID CARRIER SENSE MULTIPLE ACCESS SYSTEM WITH COLLISION AVOIDANCE FOR IEEE 802.15.4 TO ACHIEVE BETTER COEXISTENCE WITH IEEE 802.11

CROSS REFERENCE TO RELATED APPLICATIONS

This application claims the priority of U.S. patent application Ser. No. 16/676,676, filed Nov. 7, 2019, which is hereby incorporated in its entirety by reference.

FIELD OF THE INVENTION

This invention relates generally to a Hybrid Carrier Sense Multiple Access system, more particularly to the Hybrid Carrier Sense Multiple Access System with collision avoidance for IEEE 802.15.4 to achieve better coexistence with IEEE 802.11.

BACKGROUND OF THE INVENTION 5G and Internet of Things (IoT) applications have been emerging. A broad range of wireless communication standards emerge to cater the diverse applications. IEEE 802.11 is a set of standard family that can operate in the Sub-1 GHz, 2.4 GHz, 5 GHz, 6 GHz and 60 GHz frequency bands. IEEE 802.15.4 is set of standard family that can operate in the Sub-1 GHz, 2.4 GHz and 6 GHz frequency bands. As a result, both IEEE 802.11 standards and IEEE 802.15.4 standards can operate in the Sub-1 GHz, 2.4 GHz and 6 GHz frequency bands. In every frequency band, the spectrum allocation is limited, especially in the Sub-1 GHz frequency band, where besides IEEE 802.11 and IEEE 802.15.4, there are other wireless technologies such as LoRa and SigFox. It indicates that the co-located wireless networks may be forced to share frequency spectrum. In other words, they have to coexist. As a result, the coexistence issue must be addressed, especially, the existing wireless technologies are developed with coexistence being not well addressed.

The coexistence can be divided into two categories: homogeneous coexistence, i.e., coexistence of wireless networks using same communication protocol, and heterogeneous coexistence, i.e., coexistence of wireless networks using different communication protocol, e.g., coexistence of IEEE 802.11 and IEEE 802.15.4. The carrier sense multiple access with collision avoidance (CSMA/CA) mechanism is employed by IEEE 802.11 and IEEE 802.15.4 to address homogeneous coexistence. However, heterogeneous coexistence is an issue not well addressed. Some wireless technologies are developed without taking heterogeneous coexistence into account, e.g., IEEE 802.15.4g only considers homogeneous coexistence. Some wireless technologies are developed with heterogeneous coexistence in consideration, but with coexistence criteria set to benefit their own devices, e.g., IEEE 802.11ah defines higher energy detection thresholds for coexistence assessment that can lead lower power IEEE 802.15.4g networks being severely interfered.

IEEE 802.15.4g is a standard in IEEE 802.15.4 standard family designed for wireless smart utility networks (Wi-SUN). As a result, IEEE 802.15.4g is also known as Wi-SUN. IEEE 802.15.4g only considers homogeneous coexistence and does not provides heterogeneous coexistence mechanism.

IEEE 802.11ah is a standard in IEEE 802.11 standard family and is also named as Wi-Fi HaLow. IEEE 802.11ah is designed to operate in the Sub-1 GHz (S1G) frequency band. IEEE 802.11ah provides heterogeneous coexistence mechanism. It specifies that an S1G station (STA) uses energy detection (ED) based clear channel assessment (CCA) with a threshold of −75 dBm per MHz to improve coexistence with other S1G systems. If a S1G STA detects energy above that threshold on its channel, then the mechanisms such as changing operating channel and deferring transmission might be used to mitigate interference.

Is the heterogeneous coexistence mechanism provided in IEEE 802.11ah sufficient? FIG. 1 shows that data packet delivery rates of the co-located IEEE 802.11ah network and IEEE 802.15.4g network operating in S1G frequency band. In some cases, packet(s) may be referred to as frame(s). Clearly, IEEE 802.15.4g network suffers when network traffic is heavy, but IEEE 802.11ah network always achieves near 100% of packet delivery rate. Therefore, the heterogeneous coexistence mechanism provided in IEEE 802.11ah does not work well when network traffic is heavy and further heterogeneous coexistence mechanism for IEEE 802.11ah and IEEE 802.15.4g must be provided.

An easy solution is to have IEEE 802.11ah network and IEEE 802.15.4g network operate on non-overlapping frequency channels. However, such non-overlapping frequency channels may not be available due to limited spectrum allocation, especially in the S1G frequency band. As a result, IEEE 802.11ah network and IEEE 802.15.4g network may be forced to share frequency band, i.e., coexist.

Accordingly, it is desirable to provide heterogeneous coexistence method for IEEE 802.15.4g network to achieve better coexistence with the co-located IEEE 802.11ah network when they share frequency spectrum with the objective of improving IEEE 802.15.4g network performance without degrading IEEE 802.11ah network performance.

SUMMARY OF THE INVENTION

Some embodiments of the invention are based on a recognition that spectrum allocation is limited, especially, in the Sub-1 GHz (SIG) frequency band. Accordingly, the co-located IEEE 802.11ah networks and IEEE 802.15.4g networks may be forced to share frequency spectrum, i.e., the co-located IEEE 802.11ah networks and IEEE 802.15.4g networks have to coexist.

Some embodiments of the invention are based on a recognition that IEEE 802.15.4g does not provide heterogeneous coexistence mechanism and IEEE 802.11ah provided energy detection (ED) based Clear Channel Assessment (CCA) mechanism for heterogeneous coexistence, but the higher ED threshold specified is in favor of IEEE 802.11ah devices. As a result, the co-located IEEE 802.11ah networks can severely interfere with IEEE 802.15.4g networks when they share frequency spectrum due to the fact that the higher ED threshold enables IEEE 802.11ah devices to ignore lower power transmissions of IEEE 802.15.4g devices even if the receiving energy level of the IEEE 802.15.4g transmissions is high enough for IEEE 802.15.4g devices to decode the data being transmitted. The ignorance can cause transmission of IEEE 802.11ah devices collides with the ongoing transmission of IEEE 802.15.4g devices.

Some embodiments of the invention are based on a recognition that the co-located IEEE 802.11ah networks can also severely interfere with IEEE 802.15.4g networks when they share frequency spectrum due to the faster CSMA/CA mechanism of IEEE 802.11ah. The faster CSMA/CA mechanism enables IEEE 802.11ah devices to have immediate channel access without random backoff or have shorter random backoff time period for more aggressive channel access, which can interrupt IEEE 802.15.4g transmission process and cause IEEE 802.15.4g transmission failure. Accordingly, coexistence method must be provided for IEEE 802.15.4 standard family to achieve better coexistence with IEEE 802.11 standard family and other wireless technologies.

Some embodiments of the invention provide the hybrid carrier sense multiple access with collision avoidance (CSMA/CA) for IEEE 802.15.4g, i.e., Wi-SUN, to achieve better coexistence with IEEE 802.11ah, i.e., Wi-Fi HaLow. The hybrid CSMA/CA enables IEEE 802.15.4g devices to switch between two CSMA/CA modes, i.e., Mode-1 CSMA/CA and Mode-2 CSMA/CA. In Mode-1 CSMA/CA, conventional IEEE 802.15.4 CSMA/CA procedure is performed. In Mode-2 CSMA/CA, the immediate channel access enabled CSMA/CA procedure is performed. The Mode-1 CSMA/CA is applied if IEEE 802.11ah interference is not severe and the Mode-2 CSMA/CA is applied if IEEE 802.11ah interference is severe. In other words, Mode-2 CSMA/CA provides potential for IEEE 802.15.4g devices to have immediate channel access in order to compete with more aggressive IEEE 802.11ah devices.

Some embodiments of the invention provide methods for IEEE 802.15.4g devices to determine the severity of IEEE 802.11ah interference. More specifically, the channel access failure rate caused by IEEE 802.11ah transmission, IEEE 802.11ah channel occupancy probability and the collision probability caused by IEEE 802.11ah transmission are provided for IEEE 802.15.4g devices to estimate the severity of IEEE 802.11ah interference.

Some embodiments of the invention are based on a realization that when channel becomes idle, the immediate channel access of multiple IEEE 802.15.4g devices can also cause collision among IEEE 802.15.4g transmissions. Accordingly, an optimal probability is provided for IEEE 802.15.4g devices such that within a neighborhood, at most one of IEEE 802.15.4g devices performs immediate channel access and the rest of IEEE 802.15.4g devices perform random backoff with increased the backoff parameters to avoid colliding with immediate channel access transmission.

Some embodiments of the invention provide a method for IEEE 802.15.4g devices to compute optimal probability of the immediate channel access (ICA) such that an IEEE 802.15.4g device has 1/N probability to perform immediate channel access, where N is the total number of IEEE 802.15.4g devices within a neighborhood. In some cases, the probability of the ICA may be determined or changed based on a degree of communication congestion α measured by individual nodes or PANCs. This can provide great advantages when the input traffic of peripheral nodes is sufficiently low so that the ICA can be performed more frequently when 1/N is small.

Some embodiments of the invention provide a method for an IEEE 802.15.4g device to determine the number of IEEE 802.15.4g neighbors within its neighborhood by monitoring neighbor's packet transmissions.

Some embodiments of the invention enable IEEE 802.15.4g devices to perform Mode-2 CSMA/CA by enabling immediate channel access function or configuring backoff parameter values different from default parameter values used in Mode-1 CSMA/CA.

Some embodiments of the invention enable IEEE 802.15.4 devices to perform Mode-2 backoff by configuring different backoff parameter values from default parameter values used in Mode-1 backoff.

According to some embodiments of the present invention, a wireless smart utility network (Wi-SUN) device participating in a Wi-SUN network for coexistence with a Wi-Fi HaLow network sharing frequency spectra between the networks includes a receiver to receive packets of neighbor Wi-SUN devices; a memory configured to store computer executable programs including a hybrid carrier-sense multiple access with collision avoidance (CSMA/CA) control program and Wi-SUN CSMA/CA control program; a processor configured to execute the hybrid CSMA/CA control program including instructions that cause the processor to perform steps of estimating a severity of Wi-Fi Halow interference based on one or combination of the severity metrics; selecting a CSMA/CA mode between predetermined CSMA/CA modes in response to the estimated severity; computing an optimal probability for performing an immediate channel access or a backoff procedure according to the selected CSMA/CA mode; detecting a channel status based on the hybrid carrier-sense multiple access, wherein if the channel status is not idle, a maximum limited number of times for re-attempting a packet transmission is checked to determine an allowability of re-attempting the packet transmission; and a transmitter to transmit packets according to a determination result of the allowability.

Further, some embodiments of the present invention are based on recognition that a non-transitory computer readable recoding medium storing thereon computer executable programs including a hybrid carrier-sense multiple access with collision avoidance (CSMA/CA) control program and Wi-SUN CSMA/CA control program for coexistence of a Wi-Fi HaLow network and a Wi-SUN network sharing frequency spectra between the networks, wherein the executable programs cause a processor to perform steps of estimating a severity of Wi-Fi Halow interference based on a severity estimation metric; selecting a CSMA/CA mode between predetermined CSMA/CA modes in response to the estimated severity; performing an immediate channel access or a backoff procedure according to the selected CSMA/CA mode; and detecting a channel status based on the hybrid carrier-sense multiple access, wherein if the channel status is not idle, a maximum limited number of times for re-attempting a packet transmission is checked to determine an allowability of re-attempting the packet transmission.

It should be noted that although the present disclosure describes on methods/systems for coexistence of IEEE 802.11ah networks and IEEE 802.15.4g networks as examples, the methods/systems according to the present invention are not limited to the standards of IEEE 802.11ah networks and IEEE 802.15.4g networks. For instance, the methods/systems described in the present disclosure can be applied to IEEE802.15.4 standard family including IEEE 802.15.4w or the communication systems which use CSMA/CA and random backoff method.

Furthermore, it should be noted that the methods/systems are not limited to the Sub-1 GHz radio bands used by IEEE 802.11ah and IEEE 802.15.4g. The methods/systems according to the present invention can be applied to other types of communication systems. For instance, the methods/systems can be applied to systems using industrial, scientific, and medical (ISM) radio bands, which include different communication systems that operate based on different communication protocols using common/overlapped frequency bands and can detect the other communication systems by detecting signal levels or sensing carriers.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1 shows sample data packets receiving rates of the coexisting IEEE 802.11ah network and IEEE 802.15.4g network using coexistence control mechanisms provided in IEEE 802.11ah standard;

FIG. 4 shows IEEE 802.11ah and IEEE 802.15.4g backoff parameter value comparison;

FIGS. 7A and 7B show examples of data packet delivery rates using conventional IEEE 802.15.4 CSMA/CA method and hybrid IEEE 802.15.4 CSMA/CA method in the presence of IEEE 802.11 interference;

DETAILED DESCRIPTION OF THE PREFERRED EMBODIMENTS

Figure 2A:
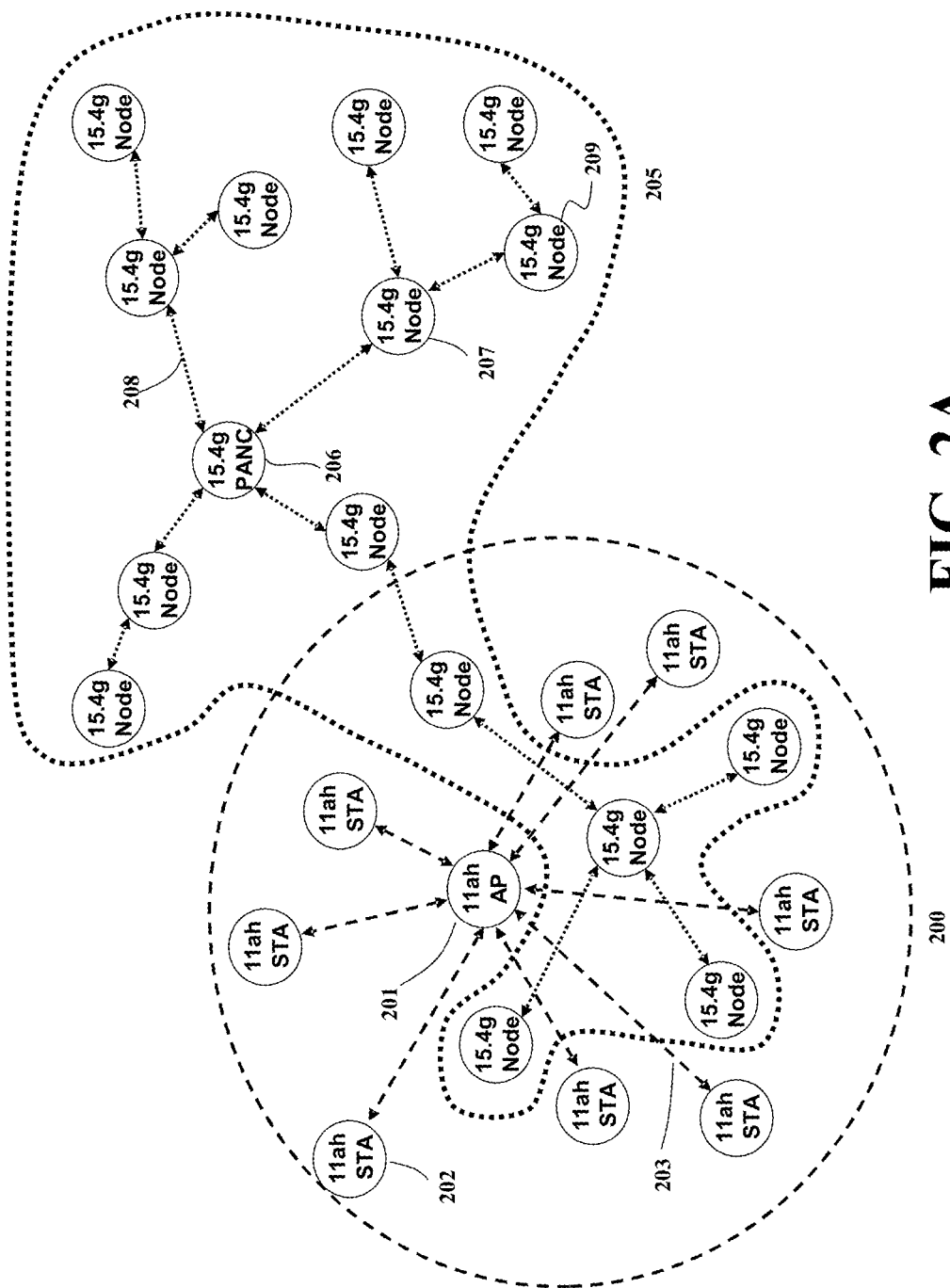
FIG. 2A is a schematic diagram of the heterogeneous system consisting of the co-located IEEE 802.11ah network and 82.15.4g network, according to some embodiments of the present invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

IEEE 802.11 standard family and IEEE 802.15.4 standard family are two widely used wireless technologies for local area networks. IEEE 802.11ah and IEEE 802.15.4g are two standards designed to operate in the Sub-1 GHz (S1G) frequency band while IEEE 802.15.4g can also operate in the 2.4 GHz frequency band. IEEE 802.11ah and IEEE 802.15.4g are used as example technologies to embody the coexistence methods of the invention. The technologies provided can be applied to coexistence of IEEE 802.11 standard family and IEEE 802.15.4 standard family.

IEEE 802.11ah is also called as Wi-Fi HaLow. An IEEE 802.11ah network typically consists of an access point (AP) and stations (STAs). IEEE 802.11ah AP can associate with more than 8000 STAs. IEEE 802.15.4g is designed for wireless smart utility networks (Wi-SUN). Therefore, IEEE 802.15.4g is also known as Wi-SUN, and an IEEE 802.15.4g may be referred to as a Wi-SUN device. There are millions of IEEE 802.15.4g devices that have already been deployed. IEEE 802.15.4g network typically consists of a personal area network coordinator (PANC) and the associated devices called nodes. A PANC can associate with more 60000 nodes. Both IEEE 802.11ah and IEEE 802.15.4g are designed for smart utility, smart city and other IoT applications. As a result, it is highly possible that IEEE 802.11ah networks and IEEE 802.15.4g networks are co-located and share frequency band, i.e., coexist. Therefore, ensuring harmonious coexistence of IEEE 802.11ah network and IEEE 802.15.4g network in the S1G frequency band is critical.

IEEE 802.15.4g does not provides heterogeneous coexistence mechanism. IEEE 802.11ah provides heterogeneous coexistence mechanism. An S1G STA uses energy detection (ED) based clear channel assessment (CCA) with a threshold of −75 dBm per MHz to improve coexistence with other S1G systems. If a S1G STA detects energy above that threshold on its channel, then the mechanisms such as changing operating channel and deferring transmission might be used to mitigate interference.

There is a question as to if the heterogeneous coexistence mechanism is provided in IEEE 802.11ah sufficient to coexist well with IEEE 802.15.4g network. FIG. 1 shows that data packet delivery rates of the co-located IEEE 802.11ah network and IEEE 802.15.4g network operating in S1G frequency band. Clearly, IEEE 802.15.4g network suffers when network traffic is heavy, but IEEE 802.11ah network always achieves near 100% of packet delivery rate. Therefore, the heterogeneous coexistence method for IEEE 802.15.4g must be provided to achieve better performance in the presence of IEEE 802.11ah interference.

FIG. 2A shows a schematic of the heterogeneous system consisting of the coexisting IEEE 802.11ah network 200 and IEEE 802.15.4g network 205. IEEE 802.11ah network 200 contains an AP 201 and the associated STAs 202, in which AP 201 and STAs 202 communicate via the IEEE 802.11ah wireless link 203. IEEE 802.15.4g network 205 contains a PANC 206 and the associated nodes 207. PANC and nodes communicate through the IEEE 802.15.4g wireless link 208. Two networks are co-located close enough so that portion of the IEEE 802.15.4g network 205 is within the communication range of IEEE 802.11ah network 200. Therefore, one network can interfere with another network when their operating channels share frequency spectrum.

The topology of IEEE 802.11ah network and IEEE 802.15.4g network can be star, mesh or tree, e.g., IEEE 802.11ah network 200 is star topology and IEEE 802.15.4g network 205 is tree topology. In some cases, a smart meter system network (IEEE 802.15.4g) can be configured as tree topology. It should be noted that each of the connections of the tree type configurations can be changed according to the states of communications. In other words, each node can be connected by a multi pop (Post Office Protocol) manner: it is not necessary for all nodes to be directly connected to the PANC 206, e.g. PANC 206↔15.4 g Node 207↔15.4 g Node 209.

According to embodiments of the present invention, as the interference by IEEE 802.11ah wireless networks can be detected by each node of IEEE 802.15.4g wireless networks and the use of immediate channel access can be determined, the present invention can be applied to multiple-cell configurations which include plural IEEE 802.15.4g networks.

Furthermore, the whole IEEE 802.15.4g networks can be configured to collect information related network traffic to detect the degree of the interference caused by IEEE 802.11ah wireless networks.

According to some embodiments of the present invention, a wireless smart utility network device (Wi-SUN device or IEEE 802.15.4g device) participating in a Wi-SUN network for coexistence with a Wi-Fi HaLow (IEEE 802.11ah) network sharing frequency spectra between the networks includes a receiver to receive packets of neighbor Wi-SUN devices, a memory configured to store computer executable programs including a hybrid carrier-sense multiple access with collision avoidance (CSMA/CS) control program and Wi-SUN Backoff control program, and a processor configured to execute the computer executable programs including instructions, where the instructions cause the processor to perform steps of estimating a severity of Wi-Fi Halow interference based on a severity estimation method, switching (selecting) a CSMA/CA mode between predetermined CSMA/CA modes in response to the estimated severity; and performing an immediate channel access or a backoff procedure according to the selected CSMA/CA mode. Further the Wi-SUN device includes a transmitter to transmit packets according to a result of the steps.

Figure 2B:
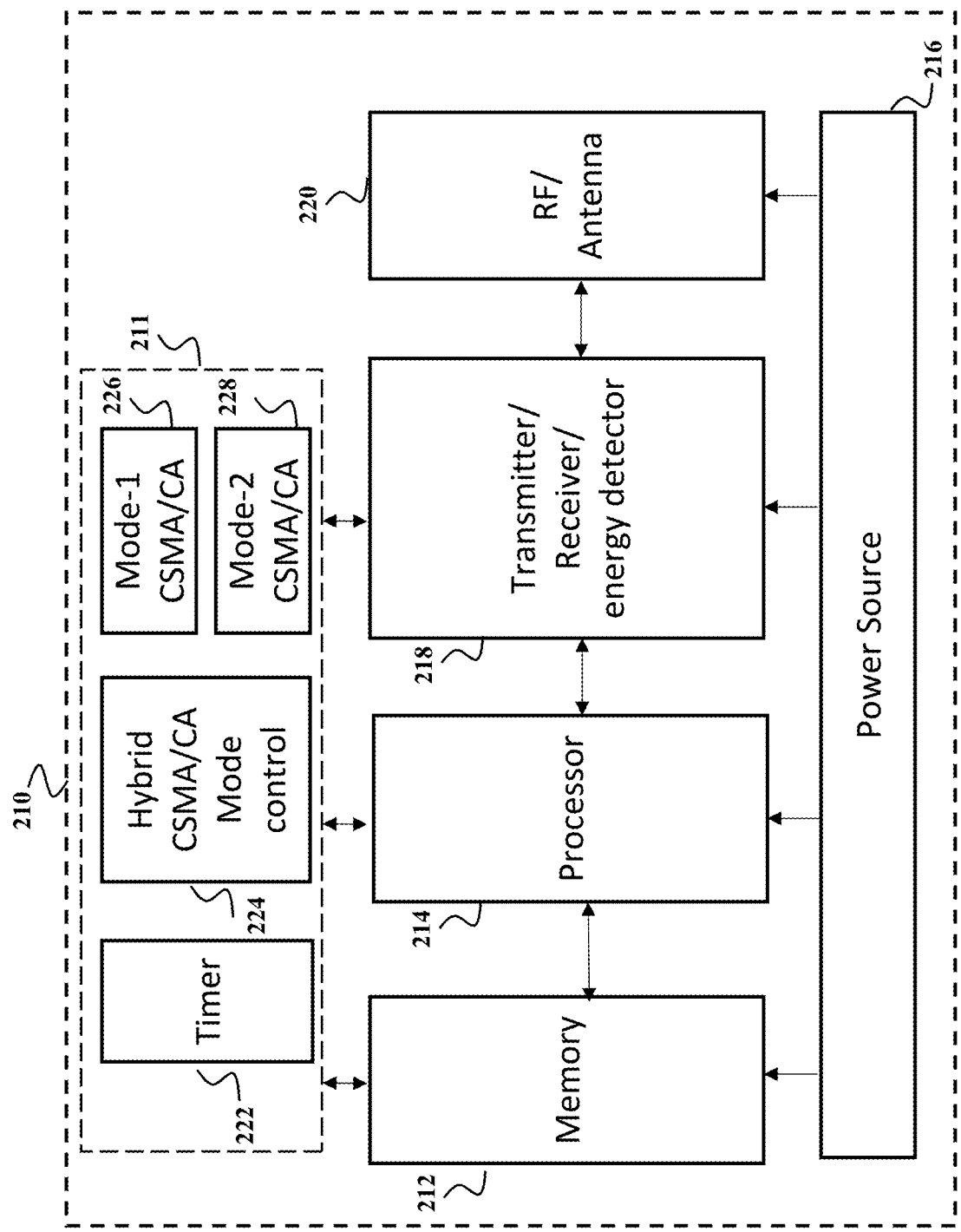
FIG. 2B is a schematic of a structure of an IEEE 802.15.4g device participating in forming the networks of FIG. 2A, according to some embodiments of the present invention.

FIG. 2B shows an example of a structure of an IEEE 802.15.4g device participating in forming the networks of FIG. 2A, in which an IEEE 802.15.4g device 210 may include a processor 214, memory 212, a power source 216, a transceiver 218 including transmitter, receiver and energy detector and a RF antenna 220. Further, control programs are included in a storage 211 in connection with the memory 212, the processor 214 and the transceiver 218. The control programs 211 include a CSMA/CA mode control (program) 224, Mode-1 CSMA/CA program 226 and Mode-2 CSMA/CA program 228, and a timer 222 that is used by the transceiver 218 to perform the CSMA/CA mode control (program) 224. Depending on the severity of IEEE 802.11ah interference, the hybrid CSMA/CA mode control program 224 can either call conventional IEEE 802.15.4 CSMA/CA procedure or immediate channel access enabled CSMA/CA procedure.

The Interference Caused by the Higher Energy Detection (ED) Threshold of IEEE 802.11Ah IEEE 802.11ah defines higher ED threshold than the ED threshold of IEEE 802.15.4g, which is typically 10 dB greater than the IEEE 802.15.4g receiver sensitivity (RS). If an IEEE 802.15.4g receiver detects the energy level of IEEE 802.15.4g signal above the receiver sensitivity, the receiver can decode the data from the transmitted signal.

Figure 3:
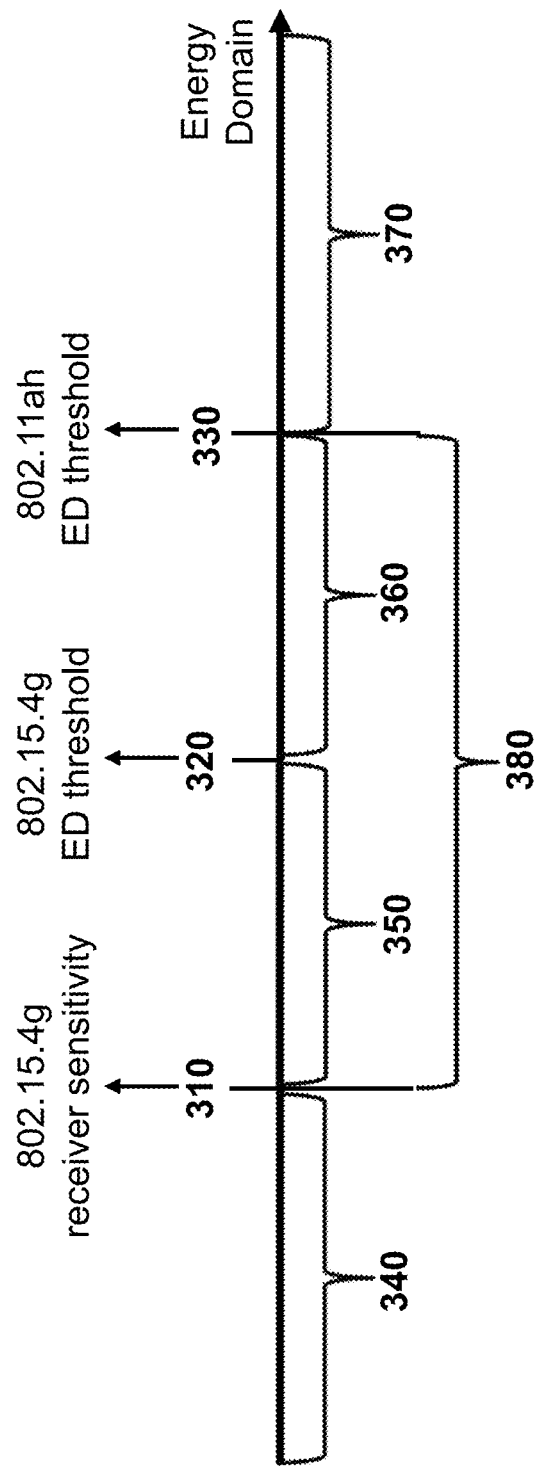
FIG. 3 shows the energy level range in which IEEE 802.11ah devices interfere with IEEE 802.15.4g devices due to higher energy detection threshold of IEEE 802.11ah.

FIG. 3 shows the distribution of IEEE 802.15.4g receiver sensitivity 310, IEEE 802.15.4g ED threshold 320 and IEEE 802.11ah ED threshold 330 in energy domain. These three parameters divide energy domain into four regions 340, 350, 360 and 370. The region 340 represents the energy level range less than IEEE 802.15.4g receiver sensitivity 310, the region 350 represents the energy level range greater than IEEE 802.15.4g receiver sensitivity 310 but less than IEEE 802.15.4g ED threshold 320, the region 360 represents the energy level range greater than IEEE 802.15.4g ED threshold 320 but less than IEEE 802.11ah ED threshold 330. Further, the region 370 represents the energy level range greater than IEEE 802.11ah ED threshold 330.

The higher ED threshold of IEEE 802.11ah can lead IEEE 802.11ah transmission colliding with IEEE 802.15.4g transmission. If the detected energy level of an IEEE 802.15.4g packet transmission is in region 380, the packet is readable by IEEE 802.15.4g device, but IEEE 802.11ah device ignores the detected packet transmission since the detected energy level is lower than IEEE 802.11ah ED threshold 330, in other words, IEEE 802.11ah device treats channel as idle. In this case, if it senses channel idle for more than distributed interframe space (DIFS) time period or its backoff counter reaches to zero, IEEE 802.11ah device will start transmission that collides with ongoing IEEE 802.15.4g packet transmission.

The Interference Caused by the Faster CSMA/CA Mechanism of IEEE 802.11Ah

FIG. 4 shows comparison of the CSMA/CA parameter values for IEEE 802.11ah and IEEE 802.15.4g. The parameters for IEEE 802.11ah are much smaller than corresponding parameters for IEEE 802.15.4g. For example, an IEEE 802.15.4g backoff period is much longer than IEEE 802.11ah time slot. Therefore, IEEE 802.11ah backoff process is much faster than IEEE 802.15.4g backoff process, which leads to much more channel access opportunities for IEEE 802.11ah devices. For example, if an IEEE 802.15.4g device senses channel is idle, it then performs receiving mode to transmission mode switching, i.e., RX-to-TX turnaround, which takes 1000 μs. During this turnaround time period, an IEEE 802.11ah device can start its transmission. As a result, IEEE 802.11ah transmission can collide with IEEE 802.15.4g transmission. Therefore, IEEE 802.11ah interferes with IEEE 802.15.4g transmission. Both data collision and acknowledgement collision can be caused by faster IEEE 802.11ah CSMA/CA method.

Hybrid CSMA/CA for IEEE 802.15.4 to Achieve Better Coexistence with IEEE 802.11

IEEE 802.15.4g device and IEEE 802.11ah device cannot communicate with each other. Therefore, IEEE 802.15.4g devices cannot coordinate with IEEE 802.11ah devices for interference mitigation. However, IEEE 802.15.4g devices can change their behaviors to obtain more channel access opportunity when they detect severe interference from IEEE 802.11ah devices. IEEE 802.15.4g devices can explore the weakness of IEEE 802.11ah devices to increase their channel access opportunity. For example, an IEEE 802.11ah device must perform random backoff process after the busy channel is detected. For example, for the first backoff, the backoff time can be 780 μs and for the second backoff, the backoff time can be 1612 μs. Before starting the random backoff process, IEEE 802.11ah device must wait for DIFS time period, i.e., the minimum idle time for immediate channel access, which is 264 μs for IEEE 802.11ah. This 264 μs waiting time plus random backoff time may give IEEE 802.15.4g devices opportunity to start transmission before IEEE 802.11ah devices if IEEE 802.15.4g devices perform immediate channel access. However, the immediate channel access by multiple IEEE 802.15.4g devices within same neighborhood can also cause collision. Therefore, an intelligent immediate channel access method needs to be provided for IEEE 802.15.4 standard family.

Figure 5:
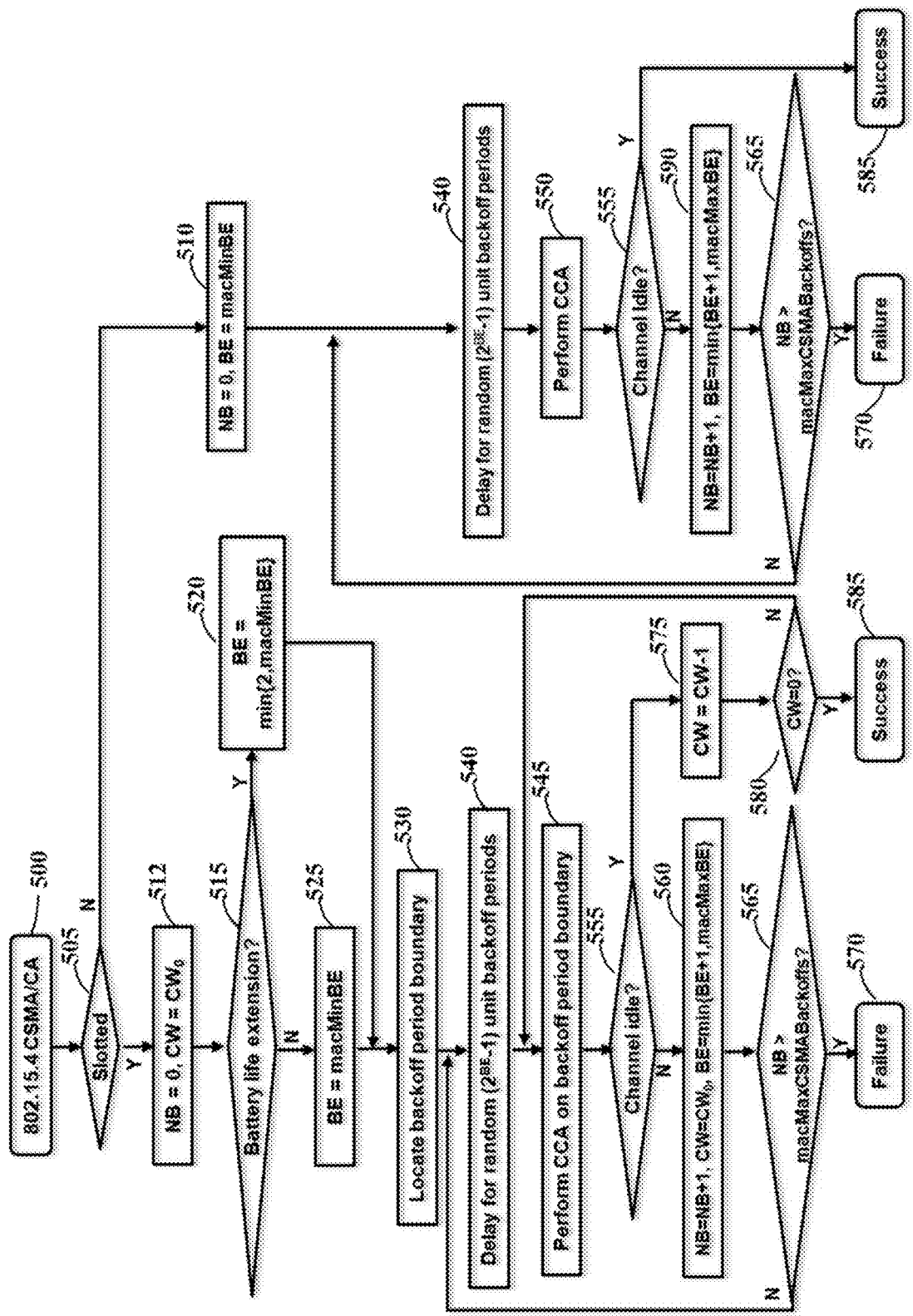
FIG. 5 shows conventional IEEE 802.15.4-2011 carrier sense multiple access with collision avoidance (CSMA/CA) method, according embodiments of the present invention.

The CSMA/CA is a mechanism used by both IEEE 802.11 and IEEE 802.15.4 standard families for homogeneous coexistence. FIG. 5 shows a conventional IEEE 802.15.4 CSMA/CA procedure 500, which also applies to IEEE 802.15.4g. For non-slotted networks, the conventional IEEE 802.15.4 CSMA/CA initials 510 number of backoff (NB) to 0 and backoff exponent (BE) to macMinBE. The CSMA/CA then delays 540 random number of backoff periods with random number drawn uniformly within interval [0, $2^{BE}-1$], which is called delay window (DW), where BE starts with macMinBE and increases until to macMaxBE. When random delay completes, CCA operation is performed 550. If channel is idle 555, the backoff success 585 and IEEE 802.15.4 device proceeds to transmit. If channel is not idle, NB and BE are updated 590. If the maximum number of backoff has been performed 565, the backoff fails 570. Otherwise, Backoff procedure continues (goes to the delays 540). For slotted network, CSMA/CA initiates 512 NB to 0 and contention window (CW) to $CW_0$, which equals to 1 or 2 depending on country regulation. CSMA/CA initiates BE to macMinBE 525 or min{2, macMinBE} 520 depending on if battery life extension is true 515. The CSMA/CA then locates backoff period boundary 530 and delays random number of backoff periods 540. When the random delay 540 completes, the CSMA/CA performs CCA 545 at backoff period boundary. If channel is an idle status 555 and CW is decreased by one in step 575. If CW equals to zero in step 580, the operation goes to the backoff success 585. Otherwise, another CCA operation is performed 545. If channel is not idle status, then NB, CW and BE are updated in step 560. If the maximum number of backoff has been performed in step 565, the operation goes to the backoff fails status in step 570. Otherwise, Backoff procedure continues (goes to step 540).

It can be seen that the larger macMinBE and/or macMaxBE increases delay window (DW).

It can also be seen that for both slotted and non-slotted network, the conventional IEEE 802.15.4 CSMA/CA performs the random delay first no matter how long channel has been idle. Using this CSMA/CA mechanism, IEEE 802.15.4 has disadvantage to compete with more aggressive IEEE 802.11, which allows immediate channel access. Therefore, conventional IEEE 802.15.4 CSMA/CA is not suitable for heterogeneous coexistence, especially for coexistence with more aggressive IEEE 802.11 networks.

Some embodiments of the invention provide hybrid CSMA/CA for IEEE 802.15.4 standard family including IEEE 802.15.4g to achieve better coexistence with IEEE 802.11 standard family including IEEE 802.11ah. The hybrid CSMA/CA allows IEEE 802.15.4 devices to have immediate channel access capability when IEEE 802.11 interference is severe. Taking into account of possible collision of immediate channel access by multiple IEEE 802.15.4 devices, hybrid CSMA/CA aims to allows at most one of IEEE 802.15.4 devices within a neighborhood to perform immediate channel access, the rest of IEEE 802.15.4 devices within same neighborhood perform backoff with increased backoff parameters to avoid collision with transmission of the immediate channel access. Another key difference between hybrid CSMA/CA and conventional CSMA/CA for IEEE 802.15.4 is the contention window (CW) configuration. In conventional CSMA/CA shown in FIG. 5, the CW is set to $CW_0$ 512, where $CW_0$ can be 1 or 2. If CW0=2, an IEEE 802.15.4 device can transmit packet only if channel is idle for two consecutive CCA operations. As shown in FIG. 4, CCA time for IEEE 802.11ah is at most 40 μs. However, CCA time for IEEE 802.15.4g is 128 μs, which is much longer than 40 μs. Therefore, to compete with IEEE 802.11ah, hybrid CSMA/CA requires only one CCA operation as shown in 625 of FIG. 6.

For instance, as seen in FIG. 2B, a wireless smart utility network (Wi-SUN) device (IEEE 802.15.4g device) participating in a Wi-SUN network for coexistence with a Wi-Fi HaLow network sharing frequency spectra between the networks may include an energy detector 218 to detect energy level of the packet transmissions, a receiver 218 to receive packets of neighbor Wi-SUN devices, a memory 212 configured to store computer executable programs 211 including a hybrid carrier-sense multiple access with collision avoidance (CSMA/CA) control program 224, a timer 222 and Wi-SUN Backoff control Program (not shown), and a processor 214 configured to execute the hybrid CSMA/CA control program 224 including instructions. The instructions can cause the processor 214 to perform steps (procedures) of estimating a severity of Wi-Fi Halow interference based on a severity estimation method, switching (selecting) a CSMA/CA mode between predetermined CSMA/CA modes in response to the estimated severity, and performing an immediate channel access or a backoff procedure according to the selected CSMA/CA mode, and a transmitter 218 to transmit packets.

Figure 6:
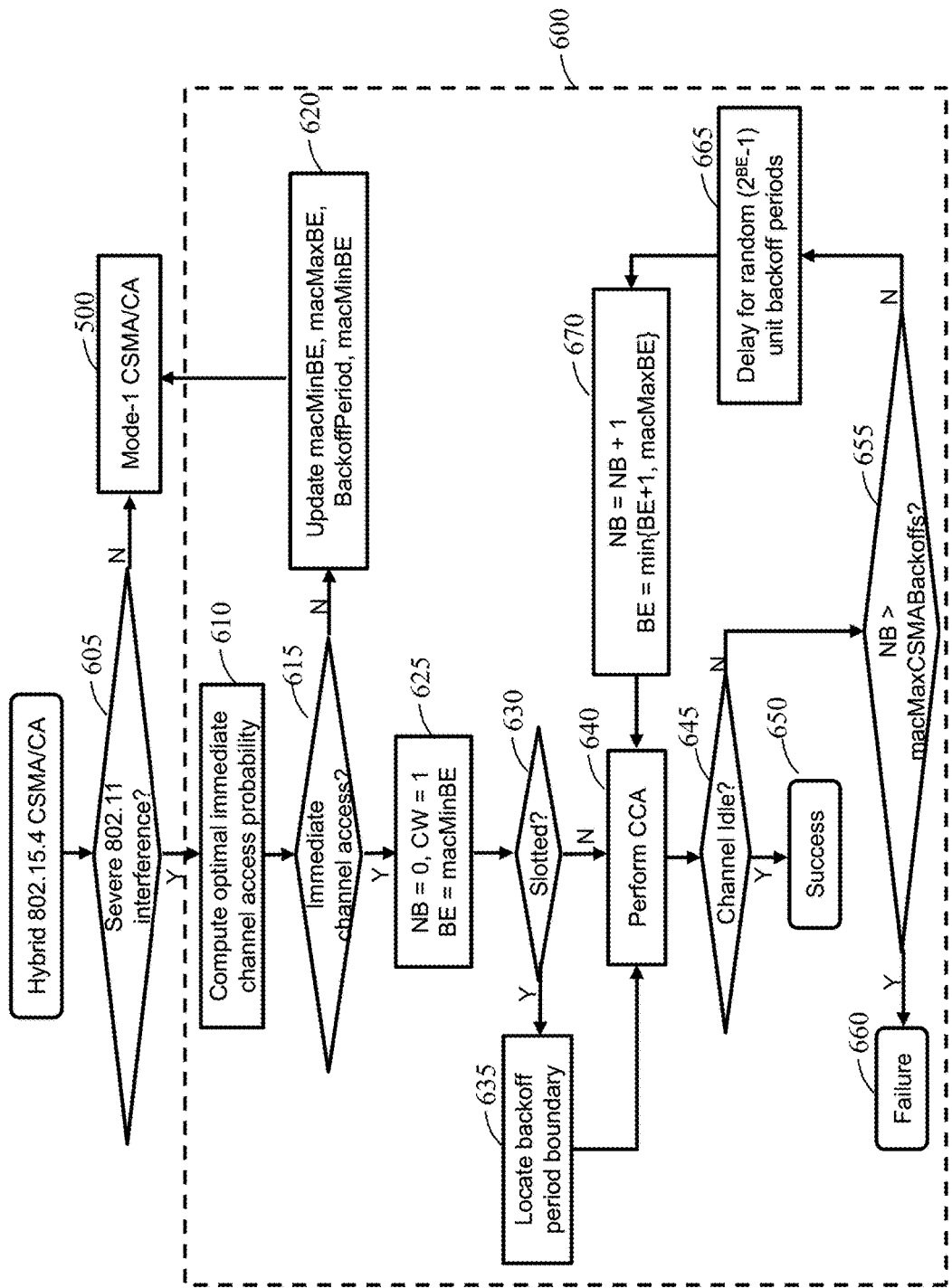
FIG. 6 shows hybrid IEEE 802.15.4 carrier sense multiple access with collision avoidance (CSMA/CA) method, according to embodiments of the present invention.

FIG. 6 shows hybrid CSMA/CA (operation program/procedure) for IEEE 802.15.4. Instead of delaying for a random number of backoff periods (step 540 in FIG. 5), the hybrid CSMA/CA program first determines if IEEE 802.11 interference is severe (severe state) in step 605. If 802.11ah interference is not severe (non-severe state), the Mode-1 CSMA/CA 226, i.e., conventional IEEE 802.15.4 CSMA/CA, is performed in procedure 500. If IEEE 802.11 interference is severe, the Mode-2 CSMA/CA 228 is performed in procedure 600. The Mode-2 CSMA/CA 228 first computes in step 610 an optimal probability for immediate channel access. Based on the optimal probability, Mode-2 CSMA/CA 228 determines in step 615 if the immediate channel access is performed or not. If the immediate channel access is not performed, the Mode-2 CSMA/CA 228 updates one or multiple base backoff parameters macMinBE, macMaxBE, BackoffPeriod and macMinBE in step 620. The Mode-2 CSMA/CA 228 then performs the Mode-1 CSMA/CA 226 in procedure 500 using updated backoff parameters. If yes, the Mode-2 CSMA/CA 228 initiates 625 NB to 1, CW to 1 and BE to macMinBE For non-slotted network, the Mode-2 CSMA/CA 228 immediately performs CCA operation in step 640. For slotted network, the Mode-2 CSMA/CA 228 locates backoff period boundary in procedure 635 and then performs CCA in procedure 640 at boundary of backoff period. If CCA returns idle channel status 645, the immediate channel access is performed, i.e., 802.15.4 starts transmission, in procedure 650. If CCA returns busy channel status at step 645, the Mode-2 CSMA/CA 228 checks if the maximum number of backoff has been performed in step 655. If yes, backoff fails as indicated in step 660. If no, Mode-2 CSMA/CA 228 delays random number of backoff periods in step 665. When random backoff completes, the Mode-2 CSMA/CA 228 updates NB and BE 670 and performs CCA 640 again.

For the backoff parameter update 620 in Mode-2 CSMA/CA, it is desirable to increase values of these parameters in order to avoid collision with the transmission of the device that is performing immediate channel access.

FIG. 7A shows the data packet delivery rates for IEEE 802.11ah and IEEE 802.15.4g networks using conventional IEEE 802.15.4 CSMA/CA method. It can be seen that IEEE 802.11ah achieves near 100% of packet delivery rate and IEEE 802.15.4g, however, only gets about 89% of packet delivery rate. FIG. 7(B) shows the data packet delivery rates for IEEE 802.11ah and IEEE 802.15.4g networks using hybrid IEEE 802.15.4 CSMA/CA method. It can be seen that IEEE 802.11ah still achieves near 100% of packet delivery rate and in this case, IEEE 802.15.4g obtains about 93% of packet delivery rate. Therefore, hybrid CSMA/CA improves IEEE 802.15.4g packet delivery rate by 4% without degrading IEEE 802.11ah network performance.

Optimal Probability Computation for Immediate Channel Access in Mode-2 CSMA/CA

Using Mode-2 CSMA/CA, an IEEE 802.15.4g device needs to compute 610 optimal probabilities for immediate channel access. To compute this probability, an IEEE 802.15.4g device needs to know the number of IEEE 802.15.4g neighbors. It can determine number of IEEE 802.15.4g neighbors by monitoring neighbor's packet transmission. Assume there are $N_g$ IEEE 802.15.4g devices in a neighborhood and each device $D_i^g$ (i=1, 2, . . . , $N_g$) has probability p to take immediate channel access and probability 1−p to perform random backoff. Let $$X = \sum_{i=1}^{N_g} X_i$$

denote binomial random variable B($N_g$, p), where $X_i$ is random variable representing decision of device $D_i^g$. Then $P(X=k)=C_k^{N_g}p^k(1-p)^{N_g-k}$ and $E[X]=N_g p$. To avoid collision among IEEE 802.15.4g transmissions due to immediate channel access, optimal strategy is that only one IEEE 802.15.4g device perform immediate channel access and rest of IEEE 802.15.4g devices perform random backoff, i.e., E[X]=1, which gives optimal probability $p_o=1/N_g$.

Even the optimal probability for the immediate channel access (ICA) is $1/N_g$, in some cases, the probability of the ICA may be determined or changed based on a degree of communication congestion α measured by individual nodes or PANCs. This can provide great advantages when the input traffic of peripheral nodes is sufficiently low so that the ICA can be performed more frequently when $1/N_g$ is small.

Methods to Estimate Severity of IEEE 802.11 Interference in Mode-2 CSMA/CA

The key of the hybrid CSMA/CA is to determine IEEE 802.11ah interference severity 605, which is used to switch CSMA/CA mode. The following four methods are provided for IEEE 802.15.4g devices to estimate IEEE 802.11ah interference severity. These four methods define four metrics to estimate IEEE 802.11ah interference severity, i.e., IEEE 802.11ah energy detection rate, channel access failure rate caused by IEEE 802.11ah, channel occupancy probability by IEEE 802.11ah and collision probability caused by IEEE 802.11ah.

Method-1: IEEE 802.11Ah Energy Detection (ED) Ratio

Using energy detection mechanism, an IEEE 802.15.4g device can detect signal energy that is higher than or equal to IEEE 802.15.4g ED threshold. Let $ED_{total}$ be the total number of times an IEEE 802.15.4g device detected energy level that is higher than or equal to IEEE 802.15.4g ED threshold within a time period T. Furthermore, using carrier sensing mechanism, an IEEE 802.15.4g device can determine if the detected signal is IEEE 802.15.4g signal. If not, then the detected signal is IEEE 802.11ah signal. Let $ED_{ah}$ be the number of times IEEE 802.11ah signal detected. Then, IEEE 802.11ah energy detection ratio $R_{ed}^h$ can be defined as $$R_{ed}^h = \frac{ED_{ah}}{ED_{total}} \quad (1)$$

Method-2: Channel Access Failure Rate Caused by IEEE 802.11Ah

Let $N_{caf}$ be the total number of channel access failure observed by an IEEE 802.15.4g device for total $N_{tx}$ transmission attempts. The $N_{caf}$ can be decomposed into $N_{caf}=N_{caf}^h+N_{caf}^g$, where $N_{caf}^h$ is number of channel access failure caused by IEEE 802.11ah and $N_{caf}^g$ is the number of channel access failure caused by IEEE 802.15.4g. An IEEE 802.15.4g device is able to compute $N_{caf}^g$ by using carrier sense mechanism. To guarantee packet header sensing, IEEE 802.15.4g device may start carrier sense early, e.g., start channel sense before backoff counter reaches to zero. Therefore, channel access failure rate $R_{caf}^h$ caused by IEEE 802.11ah can be computed as $$R_{caf}^h = \frac{N_{caf}^h}{N_{tx}} = \frac{N_{caf} - N_{caf}^g}{N_{tx}} \quad (2)$$

Method-3: IEEE 802.11Ah Channel Occupancy Probability

An IEEE 802.15.4g device can estimate the channel busy time $T_b$ by continuously sensing channel for a time period T. Its transmission time and reception time are considered as busy time. Its turnaround time is considered as idle time. In addition, IEEE 802.15.4g device is able to determine the busy time $T_b^g$ consumed by IEEE 802.15.4g transmissions via carrier sense. Therefore, IEEE 802.11ah channel occupancy probability $P_{tx}^h$ can be estimated as $$P_{tx}^h = \frac{T_b - T_b^g}{T} \quad (3)$$

Method-4: Collision Probability Caused by IEEE 802.11Ah

An IEEE 802.15.4g device cannot distinguish between collision caused by IEEE 802.11ah or IEEE 802.15.4g. Therefore, the probability of the IEEE 802.11ah transmission colliding with IEEE 802.15.4g transmission is used as a metric to estimate the IEEE 802.11ah interference severity. An IEEE 802.11ah transmission can collide with an IEEE 802.15.4g transmission only if their transmission time periods overlap.

In the IEEE 802 standards, a data transmission is successful only if its transmission process completes. Therefore, IEEE 802.11ah transmission process interference impact on IEEE 802.15.4g transmission process is considered. In the S1G frequency band, Japanese standard ARIB STD T108 allows the maximum 10% duty cycle. Therefore, the unsaturated traffic load assumption holds. An IEEE 802.11ah transmission process can interfere with a given IEEE 802.15.4g transmission only if the IEEE 802.11ah data arrives within a potential time period. This time period length is used to estimate the collision probability caused by IEEE 802.11ah.

IEEE 802.11ah channel access can be divided into 1) immediate access, in which if data arrives, channel is idle and idle channel continues for more than DIFS time period, the data is transmitted without backoff and 2) deferred access, in which if data arrives, channel is busy, then backoff process is invoked and data transmission is deferred. An IEEE 802.11ah device ignores IEEE 802.15.4g transmission if the detected energy level is below IEEE 802.11ah ED threshold and detects IEEE 802.15.4g transmission if the detected energy level is above IEEE 802.11ah ED threshold. Therefore, the IEEE 802.11ah interference scenarios can be classified into following four cases:

Case-1: IEEE 802.11ah performs immediate channel access and ignores IEEE 802.15.4g transmission
Case-2: IEEE 802.11ah performs delayed channel access and ignores IEEE 802.15.4g transmission
Case-3: IEEE 802.11ah performs immediate channel access and detects IEEE 802.15.4g transmission
Case-4: IEEE 802.11ah performs delayed channel access and detects IEEE 802.15.4g transmission Let $T_{gd}$, $T_{ga}$, $T_{hd}$ and $T_{ha}$ be IEEE 802.15.4g data transmission time, IEEE 802.15.4g ACK transmission time, IEEE 802.11ah data transmission time and IEEE 802.11ah ACK transmission time, respectively.

Figure 8A:
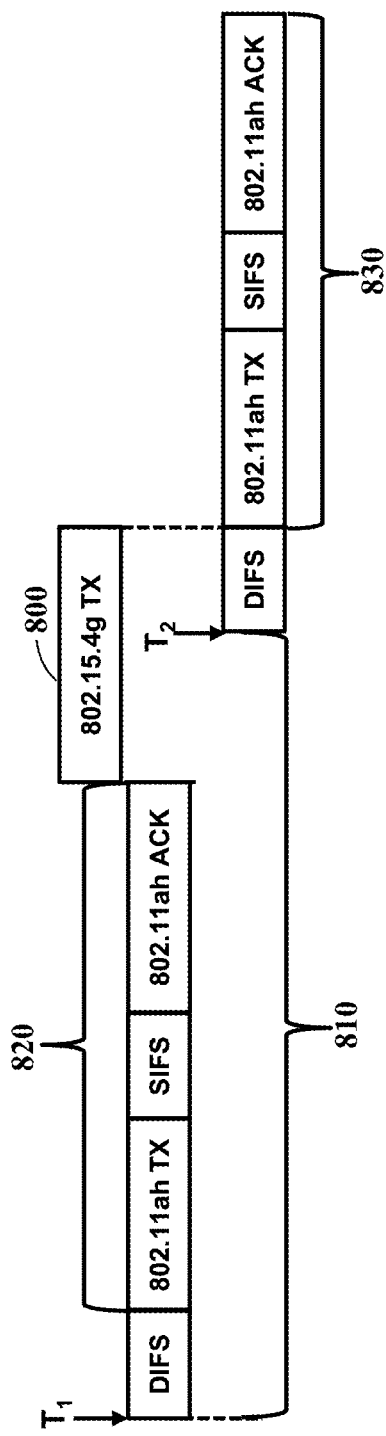
FIGS. 8A and 8B illustrate 802.11ah data packets arriving time periods that result in IEEE 802.11ah transmission process that can potentially interfere with a given IEEE 802.15.4g transmission.
Figure 8B:
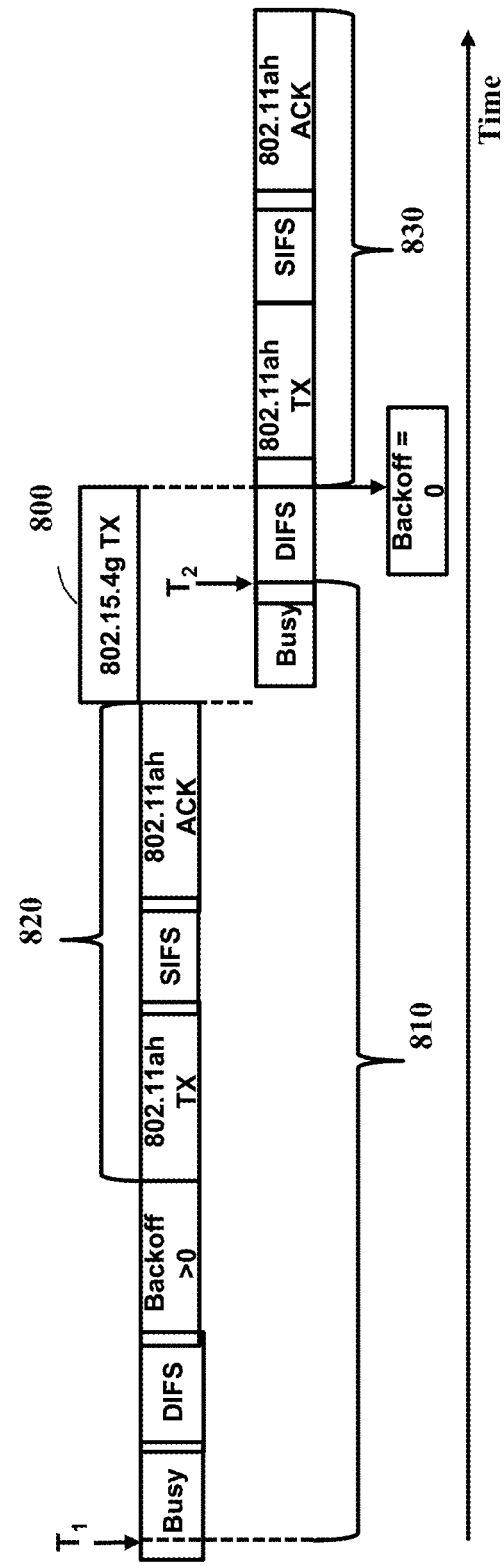

For the Case-1, FIG. 8(A) illustrates the length of potential IEEE 802.11ah data arriving period 810 that can interfere with the given IEEE 802.15.4g transmission 800. The period length is given by $T^{ig}_{im} = T_2 - T_1 = T_{hd} + \text{SIFS} + T_{ha} + T_{gd}$, where $T_1$ is the earliest data arriving time that can result in IEEE 802.11ah transmission process 820 interfering with given IEEE 802.15.4g transmission 800, $T_2$ is the latest data arriving time that can generate IEEE 802.11ah transmission process 830 interfering with given IEEE 802.15.4g transmission 800, and SIFS represents short interframe space of IEEE 802.11ah. It is obvious that the latest interfering IEEE 802.11ah transmission process 830 can take place since IEEE 802.11ah device ignores IEEE 802.15.4g transmission 800. Is it possible for the earliest interfering IEEE 802.11ah transmission process 820 to occur without being detected by IEEE 802.15.4g device? The answer is yes. IEEE 802.15.4g RX-to-TX turnaround time is 1000 μs. IEEE 802.11ah SIFS is 160 μs. There are 840 μs left for IEEE 802.11ah data transmission and ACK transmission. Even with 1 MHz channel, IEEE 802.11ah PHY rate ranges from 300 kbps to 16 Mbps. Using 3 mbps PHY rate, a 100 byte packet only takes 267 μs. The remaining 573 μs is long enough to transmit IEEE 802.11ah ACK.

For the Case-2, FIG. 2(B) depicts the length of potential IEEE 802.11ah data arriving period 810 that can interfere with the given IEEE 802.15.4g transmission 800. In this case, the earliest interfering IEEE 802.11ah transmission process 820 performs random backoff with backoff period length greater than zero. The latest interfering IEEE 802.11ah transmission process 830 happens to select a zero random backoff period length. The length of potential IEEE 802.11ah data arriving period 810 is given by $T^{ig}_{df} = T_2 - T_1 = \max\{T_{hd}, T_{gd}\} + T^h_{bo} + T_{hd} + \text{SIFS} + T_{ha} + T_{gd}$, where $\max\{T_{hd}, T_{gd}\}$ indicates that the busy channel can be caused by either IEEE 802.11ah transmission or another IEEE 802.15.4g transmission and $T^h_{bo}$ is the length of random backoff period of IEEE 802.11ah transmission device. $T^h_{bo}$ is random variable with a lower bound 0 and an upper bound CW*52 μs with $CW_{min} \leq CW \leq CW_{max}$.

Combining Case-1 and Case-2, if IEEE 802.11ah device ignores IEEE 802.15.4g transmission, potential IEEE 802.11ah data arriving time period that can interfere with IEEE 802.15.4g data transmission 800 can be estimated as $$T^{ig}_{itd} = P_i T^{ig}_{im} + (1 - P_i) T^{ig}_{df} \quad (4)$$
$$= T_{hd} + SIFS + T_{ha} + T_{gd} + (1 - P_i)$$
$$\left(\max\{T_{hd}, T_{gd}\} + T^h_{bo}\right),$$

where $P_i$ is the channel idle probability and can be estimated using method later.

Assume IEEE 802.11ah devices have Poisson data arriving distribution with mean arriving rate $\lambda$ and the IEEE 802.15.4g transmission device has $N_h$ IEEE 802.11ah neighbors. In a time period T, the probability an IEEE 802.11ah neighbor has no data arriving is $e^{-\lambda T}$ and the probability all IEEE 802.11ah neighbors have no data arriving is $e^{-N_h \lambda T}$. Therefore, the probability at least one IEEE 802.11ah neighbor having data arriving is $1 - e^{-N_h \lambda T}$. Thus, the probability IEEE 802.11ah transmission colliding with the given IEEE 802.15.4g data transmission is given by $$p^{ig}_{cd} = 1 - e^{-\lambda N_h T^{ig}_{itd}} \quad (5)$$

Case-3 is similar as Case-1, but in this case, the latest interfering IEEE 802.11ah transmission process 830 cannot start at the end of IEEE 802.15.4g transmission since during IEEE 802.15.4g transmission 800, channel is considered as busy. Therefore, the latest interfering IEEE 802.11ah transmission process 830 can only start at the start of IEEE 802.15.4g transmission. As a result, the length of potential interfering IEEE 802.11ah data arriving time period 810 is $T^{dt}_{im} = T_{hd} + \text{SIFS} + T_{ha}$.

Similarly, for Case-4, the length of potential interfering IEEE 802.11ah data arriving time period 810 is given by $T^{dt}_{df} = \max\{T_{hd}, T_{gd}\} + T^h_{bo} + T_{hd} \text{ SIFS} + T_{ha}$.

Combining Case-3 and Case-4, if IEEE 802.11ah device detects IEEE 802.15.4g data transmission, the potential IEEE 802.11ah data arriving time period that can interfere with IEEE 802.15.4g data transmission can be estimated as $$T^{dt}_{itd} = P_i T^{dt}_{im} + (1 - P_i) T^{dt}_{df} \quad (6)$$
$$= T_{hd} + SIFS + T_{ha} + (1 - P_i)\left(\max\{T_{hd}, T_{gd}\} + T^h_{bo}\right)$$

The probability IEEE 802.11ah transmission colliding with the given IEEE 802.15.4g data transmission is given by $$p^{dt}_{cd} = 1 - e^{-\lambda N_h T^{dt}_{itd}} \quad (7)$$

Notice that $P^{dt}_{cd} < p^{ig}_{cd}$ since $T^{dt}_{itd} < T^{ig}_{itd}$, which is reasonable because if IEEE 802.11ah detects IEEE 802.15.4g transmission, it takes action to avoid interference.

Besides interfering with IEEE 802.15.4g data transmission, IEEE 802.11ah transmission can also interfere with IEEE 802.15.4g ACK transmission. IEEE 802.15.4g ACK transmission waiting time AIFS is 1000 μs, which is much longer than IEEE 802.11ah DIFS time of 264 μs. Therefore, IEEE 802.11ah devices can start transmission process in between IEEE 802.15.4g data and IEEE 802.15.4g ACK. The IEEE 802.11ah transmission process can interfere with IEEE 802.15.4g ACK transmission.

Consider that IEEE 802.15.4g ACK is transmitted only if IEEE 802.15.4g data transmission is successful, the probability of IEEE 802.15.4g ACK transmission is $1 - P^g_c$, where $P^g_c$ is the IEEE 802.15.4g collision probability caused by both IEEE 802.11ah transmission and IEEE 802.15.4g transmission. IEEE 802.15.4g device can compute $P^g_c$ using number of transmission attempts and number of ACK received.

The probability of the IEEE 802.11ah transmission colliding with the IEEE 802.15.4g ACK transmission can be similarly computed as for the IEEE 802.15.4g data transmission. In this case, however, the busy channel is caused by IEEE 802.15.4g data transmission. If IEEE 802.11ah device ignores IEEE 802.15.4g ACK transmission, the probability IEEE 802.11ah transmission colliding with the IEEE 802.15.4g ACK transmission is given by $$p^{ig}_{ca} = (1 - P^g_c)(1 - e^{-\lambda N_h T^{ig}_{ita}}) \quad (8)$$

where $T^{ig}_{ita} = T_{hd} + \text{SIFS} + T_{ha} + T_{ga} + (1 - P_i)(T_{gd} + T^h_{bo})$.

If IEEE 802.11ah device detects IEEE 802.15.4g ACK transmission, the probability IEEE 802.11ah transmission colliding with the IEEE 802.15.4g ACK transmission is given by $$p_{ca}^{dt} = (1 - P_c^g)(1 - e^{-\lambda N_h T_{ita}^{dt}}) \quad (9)$$

where $T^{dt}_{ita} = T_{hd} + \text{SIFS} + T_{ha} + (1-P_i)(T_{gd} + T^h_{bo})$.

It can also be seen that $d^{dt}_{ca} < p^{ig}_{ca}$ since $T^{dt}_{ita} < T^{ig}_{ita}$.

Finally, combining all cases, the probability of the IEEE 802.11ah transmission process colliding with the given IEEE 802.15.4g transmission process $P^h_{cg}$ is given by $$P^h_{cg} = \begin{cases} P^{ig}_{cd} + P^{ig}_{ca}, & \text{if } IEEE\ 802.15.4g\ \text{data and}\ ACK\ \text{ignored} \\ P^{dt}_{cd} + P^{ig}_{ca}, & \text{if only } IEEE\ 802.15.4g\ \text{data detected} \\ P^{ig}_{cd} + P^{dt}_{ca}, & \text{if only } IEEE\ 802.15.4g\ ACK\ \text{detected} \\ P^{dt}_{cd} + P^{dt}_{ca}, & \text{if } IEEE\ 802.15.4g\ \text{data and}\ ACK\ \text{detected} \end{cases} \quad (10)$$

The $P^h_{tx}$ estimation procedure can be used to estimate $P_i$ as $$P_i = \frac{T - T_b}{T} \quad (11)$$

In addition, if IEEE 802.15.4g devices have Poisson data arriving distribution with mean arriving rate $\beta$. The $P_i$ can also be given by $$P_i = (1 - \beta((1+\alpha_g)T_{gd} + T_{ga}))^{N_g}(1 - \lambda((1-\alpha_h)T_{hd} + T_{ha}))^{N_h} \quad (12)$$

where $\alpha_g$ and $\alpha_h$ are average number of IEEE 802.15.4g retransmission and average number of IEEE 802.11ah retransmission, respectively.

For other 802.11ah traffic patterns such as uniform data arriving, the collision probability $P_{cg}^h$ can be estimated similarly.

Second Embodiment

Further, according to another embodiment of the present invention, the hybrid carrier sense multiple access with collision avoidance (Hybrid CSMA/CA) methods described above can be applied to Next-Generation Smart Meters while a transition period from the current generation Smart Meters to the Next Generation Smart Meters, where Smart Meter Systems of the current and next generations are operated based on IEEE 802.15.4g and coexist with other wireless systems such as Wi-Fi HaLow (IEEE 802.11ah), LoRa and SigFox. In other words, the Hybrid CSMA/CA method provides a solution that solves mutual interferences between heterogeneous wireless network systems.

Figure 9:
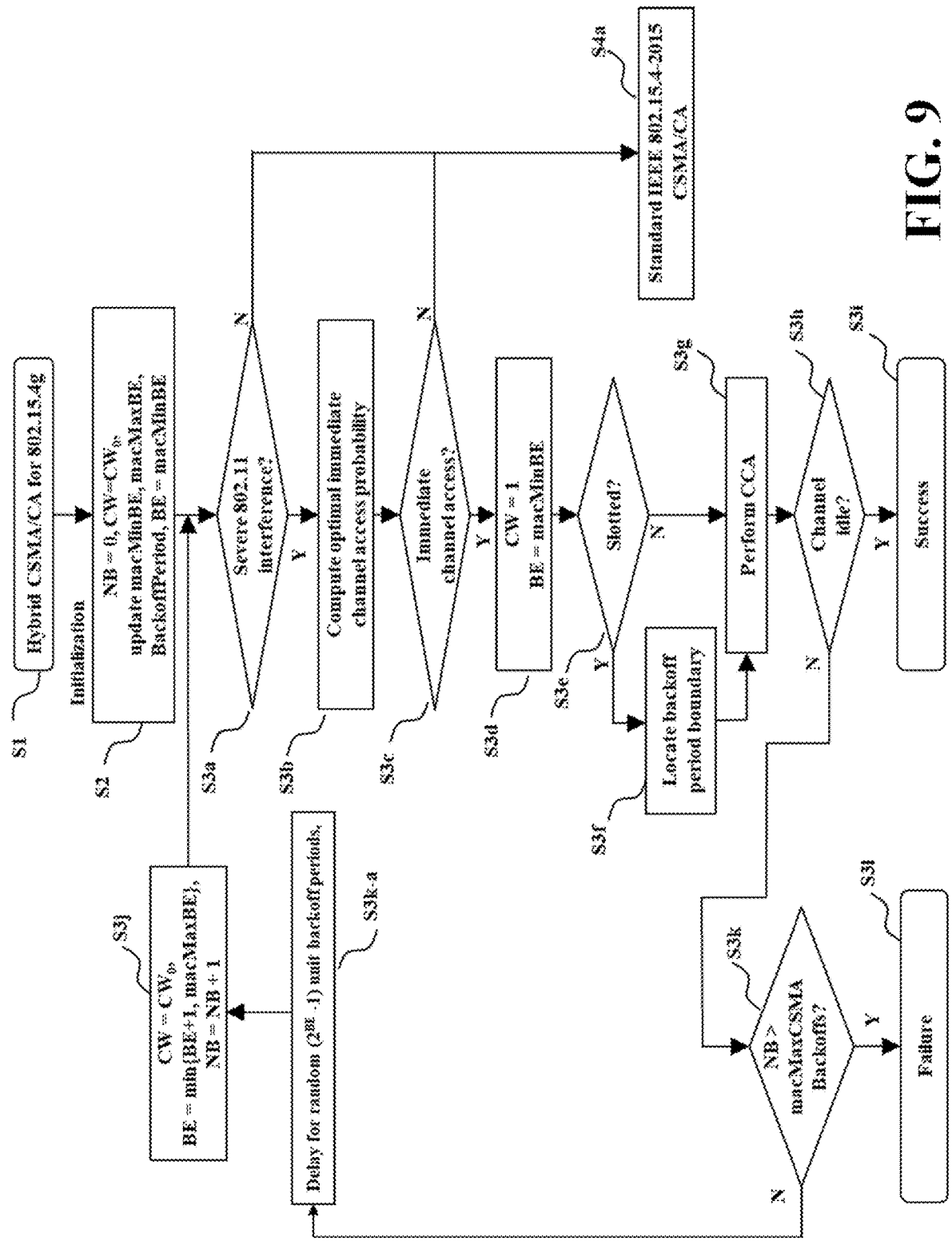
FIG. 9 shows the block diagram of the Hybrid CSMA/CA mechanism designed for IEEE 802.15.4g to allow IEEE 802.15.4g devices to re-determine the severity of IEEE 802.11ah interference during the backoff process, according to some embodiments of the present invention.

FIG. 9 shows an example of the block diagram illustrating the operations based on a Hybrid CSMA/CA system designed for IEEE 802.15.4g (being operated by Hybrid CSMA/CA algorithm) according to some embodiments of the present invention.

Besides the immediate channel access functions, the Hybrid CSMA/CA algorithm in the second embodiment allows IEEE 802.15.4g devices to re-determine the severity of IEEE 802.11ah interference during the backoff process according to some embodiments of the present invention.

The block diagram illustrates the flowchart of operations performed by an IEEE 802.15.4g device that performs the operations of the Hybrid CSMA/CA mechanism. When an IEEE 802.15.4g device is about to transmit packet(s) (or frame(s)) in response to a transmission request (or a trigger) from the higher layer, the IEEE 802.15.4g device moves to the start of the Hybrid CSMA/CA at step S1. At step S2, the initialization of sending/transmitting packet is performed. In this case, the IEEE 802.15.4g device sets initial parameters for the Hybrid CSMA/CA algorithm. In some cases, each of the packets may be identified based on sequential numbers and the packets are processed (handled) according to the sequential numbers.

Figure 10A:
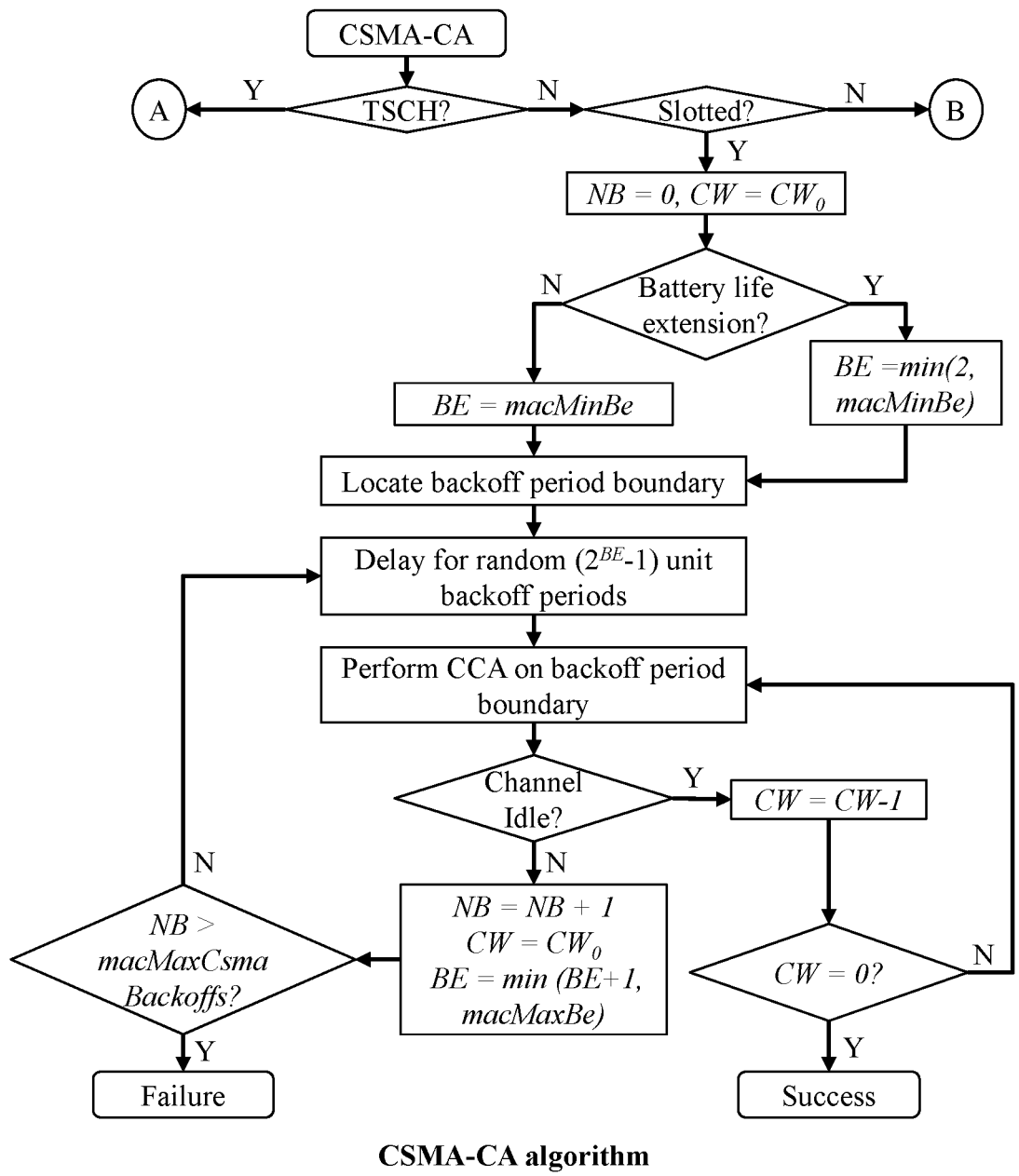
FIGS. 10A-10C illustrate a flowchart of the CSMA-CA algorithm duplicated from the IEEE Std 802.15.4-2015 as a reference.
Figure 10B:
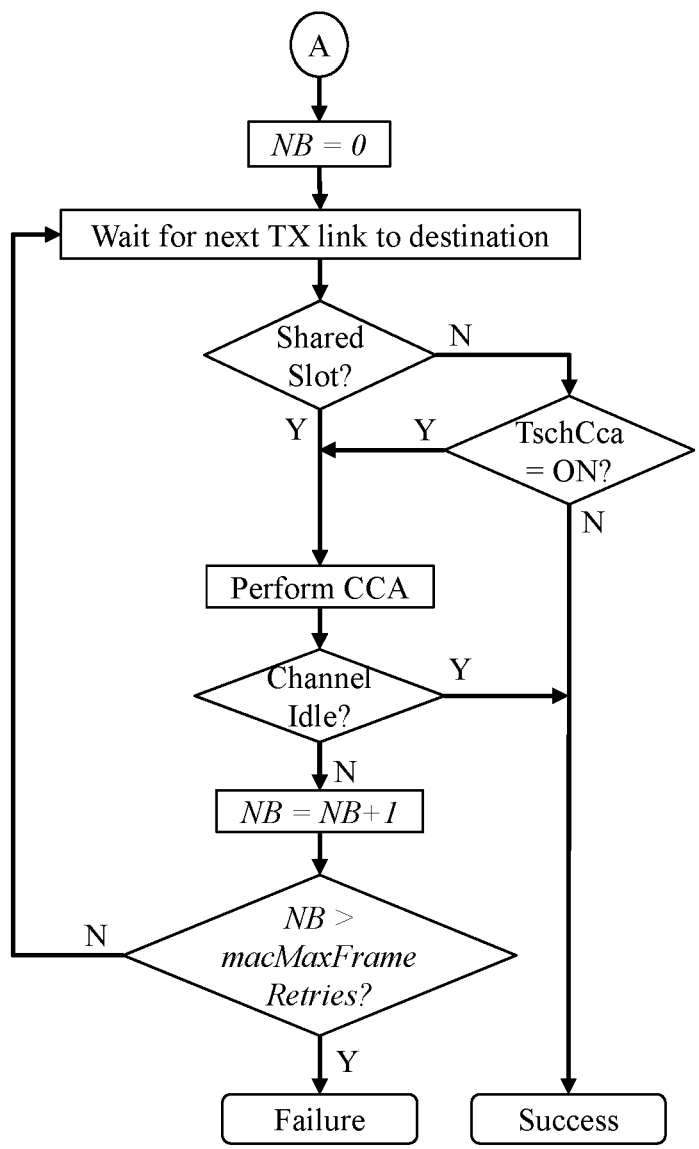
Figure 10C:
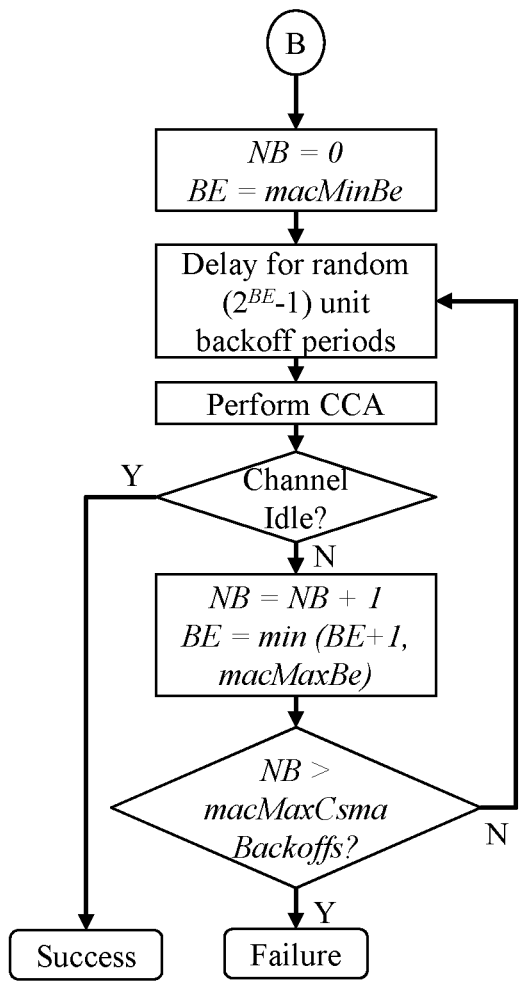

After the initialization, the operation moves to step S3a to detect the severity of the interference from IEEE 802.11ah systems operating in the same or shared frequency band. Further, it should be noted that the Hybrid CSMA/CA method according to the present invention can be applied to other heterogeneous wireless systems, like SigFox (a French global network operator f), LoRa (Long Range: a non-cellular long range and low power wireless technology), or LPWA (Long Range Wide Area Network). When the IEEE 802.15.4g device detects interference from IEEE 802.11ah devices and the detected interference level is higher than the predetermined interference threshold, the IEEE 802.15.4g device moves the operation to step S3b. On the other hand, when the Hybrid CSMA/CA algorithm determines that IEEE 802.11ah devices do not exist in the neighborhood, or the Hybrid CSMA/CA algorithm determines that devices other than IEEE 802.15.4g devices do not exist in the neighborhood, the operation moves to step S4a to perform the standard CSMA/CA algorithm. For instance, when no interference from IEEE 802.11ah devices is detected or the detected interference level is lower than a predetermined threshold (level), the IEEE 802.15.4g device selects Standard 802.15.4g CSMA/CA as step S4a, where the algorithm (or operations) of step S4a is illustrated in FIGS. 10A-10C, which illustrate a flowchart of the standard CSMA/CA algorithm duplicated from the CSMA/CA algorithm of FIG. 6-5 in IEEE Std 802.15.4-2015 for the reference of step S4a.

Step S3b computes an optimal immediate channel access probability. In this case, the IEEE 802.15.4g device computes/counts a number of other IEEE 802.15.4g devices in the neighborhood to optimize the channel access. As described earlier in section of optimal probability computation for immediate channel access in Mode-2 CSMA/CA, in order to avoid collision among IEEE 802.15.4g transmissions due to immediate channel access, an optimal strategy is performed such that only one IEEE 802.15.4g device performs the immediate channel access and the rest of IEEE 802.15.4g devices perform random backoff, i.e., E[X]=1, which gives optimal probability $P_o = 1/N_g$.

Although the Hybrid CSMA/CA algorithm allows IEEE 802.15.4g device to perform the Immediate Channel Access when the device detects severe interference from IEEE 802.11ah device(s), the immediate channel access can cause collision if all IEEE 802.15.4g devices in the neighborhood attempt to access channel at the same time. In order to avoid such collisions, when detecting severe interference from IEEE 802.11ah device(s) (S3a=yes), the Hybrid CSMA/CA algorithm computes the optimal immediate channel access probability $p_o$. Based on the optimal probability, the Hybrid CSMA/CA algorithm determines if the immediate channel access is performed at step S3c. To do so, the Hybrid CSMA/CA algorithm selects a random value from interval [0, 1]. If the selected random value is less than $P_o$ (S3c=yes), the IEEE 802.15.4g device performs immediate channel access. Otherwise (S3c=no), the IEEE 802.15.4g device does not perform immediate channel access and therefore, moves to step S4a. Based on the probability, only one of the IEEE 802.15.4g devices in a neighborhood should perform the Immediate Channel Access. The rest of the IEEE 802.15.4g devices move to step S4a. The IEEE 802.15.4g device that determines to perform the Immediate Channel Access (S3c=yes) configures the parameters with respect to the Immediate Channel Access (Immediate Channel Access parameters).

In specific, step S3c determines whether the IEEE 802.15.4g device should start immediate channel access or not based on the optimal probability computed in S3b. If the IEEE 802.15.4g device decides to not perform the immediate channel access (S3c=No), the IEEE 802.15.4g device moves to step S4a, otherwise the IEEE 802.15.4g device moves to step S3d. In the cases above, the functions of S3b and S3c maximize the IEEE 802.15.4g transmission probability by considering IEEE 802.15.4g internal collision avoidance. In step S3d, the IEEE 802.15.4g device sets the immediate channel parameter(s) and starts the immediate channel access process.

Step S3e checks the IEEE 802.15.4g channel access mode, i.e., beacon enabled or non-beacon enabled.

The steps of S3e/S3g/S3h/S3i perform the standard operations illustrated in FIG. 6-5 in IEEE Std 802.15.4-2015. When the CSMA/CA algorithm moves to step "Success", the IEEE 802.15.4 device is allowed to start transmission. Otherwise, if the CSMA/CA algorithm ends at "Failure", the IEEE 802.15.4 transmission attempt terminates with a channel access failure.

Part of the descriptions regarding to FIG. 6-5 in IEEE 802.15.4-2015 describe the operations as follows.

"FIG. 6-5 illustrates the steps of the CSMA/CA algorithm. If the algorithm ends in "Success", the MAC is allowed to begin transmission of the frame. Otherwise, the algorithm terminates with a channel access failure.

In a slotted CSMA/CA system with the BLE field set to zero, the MAC sublayer shall ensure that, after the random backoff, the remaining CSMA-CA operations can be undertaken and the entire transaction can be transmitted before the end of the CAP. If the number of backoff periods is greater than the remaining number of backoff periods in the CAP, the MAC sublayer shall pause the ackoff countdown at the end of the CAP and resume it at the start of the CAP in the next superframe. If the number of backoff periods is less than or equal to the remaining number of backoff periods in the CAP, the MAC sublayer shall apply its backoff delay and then evaluate whether it can proceed. The MAC sublayer shall proceed if the remaining CSMA-CA algorithm steps, i.e., two CCA analyses, or a single continuous CCA analysis of at least PHY CCA Duration for the regulatory domains that require listen before talk (LBT) such as the 920 MHz band in Japan, as described in "Applications of IEEE Std 802.15.4" [B3], the frame transmission, and any acknowledgment can be completed before the end of the CAP. If the MAC sublayer can proceed, it shall request that the PHY perform the CCA in the current superframe. If the MAC sublayer cannot proceed, it shall wait until the start of the CAP in the next superframe and apply a further random backoff delay before evaluating whether it can proceed again.

In a slotted CSMA-CA system with the BLE field set to one, the MAC sublayer shall ensure that, after the random backoff, the remaining CSMA-CA operations can be undertaken and the entire transaction can be transmitted before the end of the CAP. The backoff countdown shall only occur during the first macBattLifeExt Periods full backoff periods after the end of the IFS period following the beacon. The MAC sublayer shall proceed if the remaining CSMA-CA algorithm steps, i.e., two CCA analyses, or a single continuous CCA analysis of at least PHY CCA Duration for the regulatory domains that require listen LBT, the frame transmission, and any acknowledgment can be completed before the end of the CAP, and the frame transmission will start in one of the first macBattLifeExtPeriods full backoff periods after the IFS period following the beacon. If the MAC sublayer can proceed, it shall request that the PHY perform the CCA in the current superframe. If the MAC sublayer cannot proceed, it shall wait until the start of the CAP in the next superframe and apply a further random backoff delay before evaluating whether it can proceed again."

Some embodiments of the present invention add a judgement in the algorithm at step S3h. When "Channel idle=No" in step S3h, the operation moves to step S3k. In this case, the function is related to a maximum allowed number of times (threshold) for re-attempting a packet transmission. Further, step S3k determines if the number of backoffs (NB) exceeds the predetermined macMaxCSMABackoffs. If the result at step S3k is "Yes", the CSMA/CA algorithm moves to step S3l "Failure" and therefore, the IEEE 802.15.4g gives up transmission. In other words, when the result in step S3k indicates that the number of re-attempted packet transmission is greater than the maximum allowed number of times, the 802.15.4g device discards the packet (or frame) in step S3l. If the result at step S3k is "No", the number of re-attempted packet transmission is less than or equal to the maximum allowed number of times and therefore, the CSMA/CA algorithm moves to step S3k-a to perform random backoff.

After finishing backoff, the CSMA/CA algorithm moves to Step S3j, which increments the NB by 1, is an operation that is configured to allow the IEEE 802.15.4g device to re-attempt the packet transmission. Therefore, the CSMA/CA algorithm moves to the initial stage to perform transmission re-attempting. As a result, IEEE 802.11ah interference severity is re-assessed at step S3a, which is necessary because wireless interference is a dynamic phenomenon.

It is noted, however, the backoff step S3k-a can be skipped for some 802.15.4g packet transmission. For example, if the packet of an 802.15.4g device is time critical, the CSMA/CA algorithm can skip step S3k-a to reduce delay time. According to some embodiments of the present invention, the CSMA/CA algorithm may move to step 3j by skipping step S3k-a.

If "Channel idle=yes" at step S3h, the CSMA-CA algorithm advances to step S3i "Success" and the IEEE 802.15.4g device starts packet transmission.

"Channel idle=No" in step S3h indicates that the IEEE 802.15.4g device cannot transmit the packet due to the busy channel although device has attempted to transmit the packet, because a packet transmission is in the middle of being performed by an IEEE 802.11ah device or another IEEE 802.15.4g device.

When the number of re-attempted packet transmission is equal to or less than the maximum allowed number of times, the CSMA/CA algorithm returns to step S3a, which allows the 802.15.4g device to return to the sequence of steps to re-attempt a packet transmission.

When the CSMA/CA algorithm ends at step S3l "Failure", the packet is discarded. If a packet to be transmitted is discarded, part of data in the packet may not be delivered to the destination. In such a case, the upper layer (IP layer or application program) is configured to perform re-attempting a packet transmission.

Accordingly, the CSMA/CA algorithms based on some embodiments of the present invention can improve Packet Delivery Rate performance of IEEE 802.15.4g network by allowing IEEE 802.15.4g devices for more aggressive channel access and re-detecting the severity of the IEEE 802.11ah interference during the backoff process.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A wireless smart utility network (Wi-SUN) device participating in a Wi-SUN network for coexistence with a Wi-Fi HaLow network sharing frequency spectra between the networks, comprising:
   a receiver to receive packets of neighbor Wi-SUN devices;
   a memory configured to store computer-executable programs including a hybrid carrier-sense multiple access with collision avoidance (CSMA/CA) control program and Wi-SUN backoff control program;
   a processor configured to execute the hybrid CSMA/CA control program including instructions that cause the processor to perform steps of:
      estimating a severity of Wi-Fi Halow interference based on one or combination of severity metrics;
      selecting a CSMA/CA mode between predetermined CSMA/CA modes in response to the estimated severity, wherein a CSMA/CA mode switching selects Mode-1 when the estimated Wi-Fi HaLow interference severity is a non-severe state, wherein the switching selects Mode-2 when the estimated Wi-Fi HaLow interference severity is a severe state, wherein the instructions further include computing, when Mode-2 is selected, an optimal immediate channel access probability based on a number of neighboring Wi-SUN devices monitored by the computing Wi-SUN device, wherein the monitoring is performed by monitoring Wi-SUN neighbor's packet transmission;
      computing an optimal probability for performing an immediate channel access or a backoff procedure according to the selected CSMA/CA mode;
      detecting a channel status based on the hybrid carrier-sense multiple access, wherein if the channel status is not idle, a maximum allowed number of times for re-attempting a packet transmission is checked to determine an allowability of re-attempting the packet transmission wherein when a number of backoffs is less than the maximum allowed number of times, the number of backoffs is incremented; and
   a transmitter to transmit packets according to a determination result of the allowability.

2. The Wi-SUN device of claim 1, wherein the Wi-Fi HaLow interference severity is estimated based on at least one of the severity estimation metrics, an Wi-Fi HaLow energy detection ratio ($Red^h$), a channel access failure rate caused by Wi-Fi HaLow ($Reaf^h$), a channel occupancy probability by Wi-Fi HaLow ($Ptx^h$ and a collision probability caused by Wi-Fi HaLow ($Pcg^h$).

3. The Wi-SUN device of claim 2, wherein the Wi-Fi HaLow energy detection ratio is computed according to $$R_{ed}^h = \frac{ED_{ah}}{ED_{total}}.$$

4. The Wi-SUN device of claim 2, wherein the channel access failure rate caused by Wi-Fi HaLow is computed according to $$R_{caf}^h = \frac{N_{caf}^h}{N_{tx}} = \frac{N_{caf} - N_{caf}^g}{N_{tx}}.$$

5. The Wi-SUN device of claim 2, wherein the Wi-Fi HaLow channel occupancy probability is computed according to $$P_{tx}^h = \frac{T_b - T_b^g}{T}.$$

6. The Wi-SUN device of claim 2, wherein the collision probability caused by Wi-Fi HaLow is computed according to $$P_{cg}^h = \begin{cases} P_{cd}^{ig} + P_{ca}^{ig}, & \text{if } IEEE \text{ 802.15.4g data and } ACK \text{ ignored} \\ P_{cd}^{dt} + P_{ca}^{ig}, & \text{if only } IEEE \text{ 802.15.4g data detected} \\ P_{cd}^{ig} + P_{ca}^{dt}, & \text{if only } IEEE \text{ 802.15.4g } ACK \text{ detected} \\ P_{cd}^{dt} + P_{ca}^{dt}, & \text{if } IEEE \text{ 802.15.4g data and } ACK \text{ detected} \end{cases} \quad (10)$$

7. The Wi-SUN device of claim 1, wherein the predetermined CSMA/CA modes are Mode-1 and Mode-2, wherein Mode-1 is a standard Wi-SUN CSMA/CA procedure and Mode-2 is an immediate channel access enabled CSMA/CA procedure.

8. The Wi-SUN device of claim 7, wherein backoff parameter values of Mode-2 CSMA/CA are different from default backoff parameter values of Mode-1 CSMA/CA.

9. The Wi-SUN device of claim 8, wherein when other Wi-SUN devices are in a neighborhood area, at most one of the Wi-SUN devices is allowed to perform an immediate channel access and a rest of Wi-SUN devices perform backoff by increasing the backoff parameter values.

10. The Wi-SUN device of claim 9, wherein the larger backoff parameters cause a lon ger delay window (LDW), wherein for each re-backoff, the LDW is determined as:
LDW=2*Current LDW.

11. The Wi-SUN device of claim 1, wherein the transmitter transmits the packets when the computed probability indicates that the immediate channel access is allowed and the channel is in idle state.

12. The Wi-SUN device of claim 11, wherein ongoing Wi-SUN transmission process includes CCA operation-→CCA to TX Turnaround→TX start and data TX→Waiting for ACK→ACK RX.

13. The Wi-SUN device of claim 12, wherein the Wi-SUN device does not sense a channel status again after CCA to TX Turnaround, wherein a Wi-SUN recipient device does not sense the channel from the end of data packet receiving to the start of ACK packet transmission.

14. The Wi-SUN device of claim 1, wherein when the computed immediate channel access probability is less than the optimal probability $p_o=1/N_g$, the Mode-2 CSMA/CA algorithm performs immediate channel access without backoff if channel is idle, wherein if channel is busy, a random backoff is performed and the Mode-2 CSMA/CA algorithm increments the number of backoffs after the random backoff and assesses Wi-Fi HaLow interference severity again.

15. A non-transitory computer readable recoding medium storing thereon computer executable programs including a hybrid carrier-sense multiple access with collision avoidance (CSMA/CA) control program and Wi-SUN CSMA/CA control program for coexistence of a Wi-Fi HaLow network and a Wi-SUN network sharing frequency spectra between the networks, wherein the executable programs cause a processor to perform steps of:
estimating a severity of Wi-Fi Halow interference based on a severity estimation metric;
selecting a CSMA/CA mode between predetermined CSMA/CA modes in response to the estimated severity, wherein the switching selects Mode-1 when the estimated severity is a non-severe state, wherein the switching selects Mode-2 when the estimated severity is a severe state, wherein the instructions further include computing, when Mode-2 is selected, an optimal immediate channel access probability based on a number of the neighboring Wi-SUN devices monitored by the computing Wi-SUN device;
performing an immediate channel access or a backoff procedure according to the selected CSMA/CA mode; and
detecting a channel status based on the hybrid carrier-sense multiple access, wherein if the channel status is not idle, a maximum allowed number of times for re-attempting a packet transmission is checked to determine an allowability of re-attempting the packet transmission, wherein when a number of backoffs is less than the maximum allowed number of times, the number of backoffs is incremented.

16. The non-transitory computer readable recoding medium of claim 15, wherein the severity estimation method estimates the severity based on at least one of the severity estimation metrics, a channel access failure rate caused by Wi-Fi HaLow, a channel occupancy probability by Wi-Fi HaLow and a collision probability caused by Wi-Fi HaLow.

17. The non-transitory computer readable recoding medium of claim 15, wherein the predetermined CSMA/CA modes are Mode-1 and Mode-2, wherein Mode-1 is a standard Wi-SUN CSMA/CA procedure and Mode-2 is an immediate channel access enabled CSMA/CA procedure.

18. The non-transitory computer readable recording medium of claim 15, wherein when the computed immediate channel access probability is less than the optimal probability $p_o=1/N_g$, the Mode-2 CSMA/CA algorithm performs immediate channel access without backoff if channel is idle, wherein if channel is busy, a random backoff is performed and the Mode-2 CSMA/CA algorithm increments the number of backoffs after the random backoff and assesses Wi-Fi HaLow interference severity again.

19. A wireless smart utility network (Wi-SUN) device participating in a Wi-SUN network for coexistence with a Wi-Fi HaLow network sharing frequency spectra between the networks, comprising:
a receiver to receive packets of neighbor Wi-SUN devices;
a memory configured to store computer-executable programs including a hybrid carrier-sense multiple access with collision avoidance (CSMA/CA) control program and Wi-SUN backoff control program;
a processor configured to execute the hybrid CSMA/CA control program including instructions that cause the processor to perform steps of:
estimating a severity of Wi-Fi Halow interference based on one or combination of severity metrics;
selecting a CSMA/CA mode between predetermined CSMA/CA modes in response to the estimated severity, wherein the predetermined CSMA/CA modes are Mode-1 and Mode-2, wherein Mode-1 is a standard Wi-SUN CSMA/CA procedure and Mode-2 is an immediate channel access enabled CSMA/CA procedure, wherein backoff parameter values of Mode-2 CSMA/CA are different from default backoff parameter values of Mode-1 CSMA/CA;
computing an optimal probability for performing an immediate channel access or a backoff procedure according to the selected CSMA/CA mode;
detecting a channel status based on the hybrid carrier-sense multiple access, wherein if the channel status is not idle, a maximum allowed number of times for re-attempting a packet transmission is checked to determine an allowability of re-attempting the packet transmission, wherein when a number of backoffs is less than the maximum allowed number of times, the number of backoffs is incremented; and
a transmitter to transmit packets according to a determination result of the allowability.

20. A non-transitory computer readable recoding medium storing thereon computer executable programs including a hybrid carrier-sense multiple access with collision avoidance (CSMA/CA) control program and Wi-SUN CSMA/CA control program for coexistence of a Wi-Fi HaLow network and a Wi-SUN network sharing frequency spectra between the networks, wherein the executable programs cause a processor to perform steps of:
estimating a severity of Wi-Fi Halow interference based on a severity estimation metric;
selecting a CSMA/CA mode between predetermined CSMA/CA modes in response to the estimated severity, wherein the predetermined CSMA/CA modes are Mode-1 and Mode-2, wherein Mode-1 is a standard Wi-SUN CSMA/CA procedure and Mode-2 is an immediate channel access enabled CSMA/CA procedure, wherein backoff parameter values of Mode-2 CSMA/CA are different from default backoff parameter values of Mode-1 CSMA/CA;

performing an immediate channel access or a backoff procedure according to the selected CSMA/CA mode; and detecting a channel status based on the hybrid carrier-sense multiple access, wherein if the channel status is not idle, a maximum allowed number of times for re-attempting a packet transmission is checked to determine an allowability of re-attempting the packet transmission, wherein when a number of backoffs is less than the maximum allowed number of times, the number of backoffs is incremented.

* * * * *